United States Patent
Yang et al.

(10) Patent No.: US 12,213,089 B2
(45) Date of Patent: Jan. 28, 2025

(54) METHOD, APPARATUS, AND SYSTEM FOR SIGNAL SYNCHRONIZATION

(71) Applicant: HUAWEI TECHNOLOGIES CO., LTD., Guangdong (CN)

(72) Inventors: Zhiwu Yang, Beijing (CN); Dongfeng Zhang, Beijing (CN); Kai Liu, Beijing (CN); Tiegen Hu, Xi'an (CN); Guowei Ouyang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/847,360

(22) Filed: Jun. 23, 2022

(65) Prior Publication Data

US 2022/0322262 A1 Oct. 6, 2022

Related U.S. Application Data

(63) Continuation of application No. PCT/CN2019/127823, filed on Dec. 24, 2019.

(51) Int. Cl.
*H04W 56/00* (2009.01)
*H04W 92/18* (2009.01)

(52) U.S. Cl.
CPC ........ *H04W 56/0015* (2013.01); *H04W 92/18* (2013.01)

(58) Field of Classification Search
CPC .... H04W 56/0015; H04W 4/46; H04W 92/18
See application file for complete search history.

(56) References Cited

U.S. PATENT DOCUMENTS 10,470,143 B2  11/2019  Corley et al.
2013/0188618 A1  7/2013  Dinan
(Continued)

FOREIGN PATENT DOCUMENTS

CN  102625439 A  8/2012
CN  107046461 A  8/2017
(Continued)

OTHER PUBLICATIONS

WO2020032704A1—Google Patents (English Translation) (Year: 2024).*

(Continued)

*Primary Examiner* — Ji-Hae Yea

(57) ABSTRACT

A method and an apparatus for signal synchronization are disclosed. The method for signal synchronization includes: A self-synchronizing first terminal device broadcasts first synchronization information, determines whether the first terminal device and a second terminal device have implemented signal synchronization when receiving second synchronization information sent by the second terminal device, and determines, based on a determining result, whether to synchronize with the second terminal device. This reduces a probability of communication interruption caused by synchronization source switching by the first terminal device after the second terminal device performs synchronization by using the first terminal device as a synchronization source. The method for signal synchronization may be applied to scenarios such as the intelligent driving, intelligent connected vehicles, and internet of vehicles.

15 Claims, 5 Drawing Sheets

(56) References Cited

U.S. PATENT DOCUMENTS

| | | | |
|---|---|---|---|
| 2016/0227495 A1 | 8/2016 | Lee et al. | |
| 2017/0142703 A1* | 5/2017 | Xue | H04W 8/005 |
| 2017/0339738 A1 | 11/2017 | Nguyen et al. | |
| 2018/0199388 A1* | 7/2018 | Tabet | H04W 76/14 |
| 2019/0037513 A1 | 1/2019 | Yang et al. | |
| 2019/0200313 A1 | 6/2019 | Cai et al. | |

FOREIGN PATENT DOCUMENTS

| | | | |
|---|---|---|---|
| CN | 109076469 A | 12/2018 | |
| CN | 109314632 A | 2/2019 | |
| CN | 109691217 A | 4/2019 | |
| CN | 109804679 A | 5/2019 | |
| WO | 2017034296 A1 | 3/2017 | |
| WO | WO-2020032704 A1 * | 2/2020 | H04W 56/00 |

OTHER PUBLICATIONS

3GPP TS 36.331 V15.7.0 (Year: 2019).*

ZTE:"Synchronization for V2V" 3GPP Draft; R1-156661 Synchronization FORV2V, 3rd Generation Partnership Project(3GPP) Mobile Competence Centre;650 Route Des Lucioles; F-06921Sophia-Antipolis Cedex;France vol. RAN20151122WG1 No. Anaheim, USA; Nov. 15, 2015 Nov. 15, 2015 (Nov. 15, 2015) XP051003060, 6 pages.

LG Electronics:Discussion onsynchronization enhancements for PC5-basedV2V 3GPP Draft; R1-155419 Discussion Onsynchronization Enhancements for PC5-BASEDV2V LG, 3rd Generation Partnership Project(3GPP) Mobile Competence Centre;650,Route Des Lucioles;F-06921 Sophia-Ani vol. RAN WG1 No. Malmo, Sweden; Oct. 5, 2015 Oct. 9, 2015 Oct. 4, 2015 (Oct. 4, 2015) XP051002325, 3 pages.

Extended European Search Report issued in EP19958043.2, dated Nov. 8, 2022, 9 pages.

3GPP TS 36.300 V8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Dec. 2008. total 144 pages.

3GPP TS 36.304 V11.1.0 (Sep. 2012), 3rd Generation Partnership Project; Technical Specification Group Radio Access Network;Evolved Universal Terrestrial Radio Access (E-UTRA); User Equipment (UE) procedures in idle mode (Release 11), total 33 pages.

3GPP TS 36.211 V11.0.0 (Sep. 2012),3rd Generation Partnership Project;Technical Specification Group Radio Access Network; Evolved Universal Terrestrial Radio Access (E-UTRA); Physical Channels and Modulation (Release 11), total 106 pages.

"3GPP TS 36.321 V10.2.0 (Jun. 2011), 3rd Generation Partnership Project; Technical Specification Group Radio Access Network; Evolved Universal Terrestrial Radio Access (E-UTRA); Medium Access Control (MAC) protocol specification (Release 10), 54 pages".

Office Action issued in CN201980020337.X, dated Dec. 14, 2021, 6 pages.

International Search Report and Written Opinion issued in PCT/CN2019/127823, dated Jul. 1, 2020, 9 pages.

* cited by examiner

METHOD, APPARATUS, AND SYSTEM FOR SIGNAL SYNCHRONIZATION

CROSS-REFERENCE TO RELATED APPLICATIONS

This application is a continuation of International Application No. PCT/CN2019/127823, filed on Dec. 24, 2019. The disclosures of the aforementioned applications are incorporated herein by reference in these entireties.

TECHNICAL FIELD

This application relates to the field of intelligent connected vehicles (ICV), and more specifically, to a method, an apparatus, and a system for signal synchronization.

BACKGROUND

Communication manners in a vehicle-to-everything (V2X) system are collectively referred to as V2X communication (X represents anything). For example, the V2X communication includes vehicle-to-vehicle (V2V) communication, vehicle-to-infrastructure (V2I) communication, vehicle-to-pedestrian (V2P) communication, vehicle-to-network (V2N) communication, or the like. Communication between terminal devices in the V2X system is widely referred to as sidelink (SL) communication.

It should be understood that a prerequisite for performing communication between vehicles through a PC5 interface is that the vehicles implement signal synchronization with each other. However, in an existing method for implementing signal synchronization between vehicles, communication between the vehicles may be interrupted due to synchronization source switching.

SUMMARY

This application provides a method, an apparatus, and a system for signal synchronization, to improve vehicle-to-vehicle communication performance.

According to a first aspect of the present disclosure, a method for signal synchronization is provided. The method for signal synchronization may be performed by a first terminal device, or may be performed by a chip or a circuit disposed in the first terminal device. This is not limited in this application. For ease of description, the method being performed by the first terminal device may be used as an example for description.

The method for signal synchronization includes: A first terminal device broadcasts first synchronization information, where the first synchronization information includes a first synchronization signal and a first master information block, and the first terminal device is a terminal device without selected synchronization reference; the first terminal device receives second synchronization information from a second terminal device, where the second synchronization information includes a second synchronization signal and a second master information block; the first terminal device remains as the terminal device without selected synchronization reference when the first synchronization information is the same as the second synchronization information; or the first terminal device receives third synchronization information from the second terminal device after receiving the second synchronization information and waiting for a random duration when the first synchronization information is different from the second synchronization information, where the third synchronization information includes a third synchronization signal and a third master information block; and the first terminal device performs signal synchronization by using the second terminal device as a synchronization source when the first synchronization information is different from the third synchronization information; or the first terminal device remains as the terminal device without selected synchronization reference when the first synchronization information is the same as the third synchronization information.

It should be understood that, when synchronization information received by the second terminal device from a synchronization source is less than a threshold, the second terminal device uses a cycle T to periodically broadcast the synchronization information. According to the 3GPP TS 36.331 V15.7.0 technical specification, the cycle T herein may be 160 milliseconds (ms). The following uses a cycle of 160 ms as an example. For example, if the first terminal device receives the second synchronization information at a moment T1, and the random duration is 1 s, the third synchronization information is synchronization information that is received by the first terminal device from the second terminal device at a moment T2=T1+1 s+T3, where T3 is a duration from a time point after the first terminal device waits for the random duration to a time point when the first terminal device receives the third synchronization information. Because the first terminal device may not immediately receive the third synchronization information after waiting for the random duration, a value range of T3 is 0 ms≤T3≤160 ms.

According to the method for signal synchronization provided in this embodiment, the first terminal device in a self-synchronizing state also detects the second synchronization information sent by another terminal device (the second terminal device is used as an example) when broadcasting the first synchronization information of the first terminal device. Different from an existing solution in which a terminal device in a self-synchronizing state detects synchronization information, in this application, the first terminal device does not directly synchronize with the second terminal device by using the second terminal device as a synchronization source after detecting the second synchronization information, but first determines whether the first synchronization information is the same as the second synchronization information. When the first synchronization information is the same as the second synchronization information, the first terminal device and the second terminal device have implemented signal synchronization, and the first terminal device does not need to synchronize with the second terminal device by using the second terminal device as a synchronization source. When the first synchronization information is different from the second synchronization information, the first terminal device and the second terminal device currently have not implemented signal synchronization. The first terminal device does not immediately synchronize with the second terminal device by using the second terminal device as a synchronization source at a moment of detecting the second synchronization information and learning that the second synchronization information is different from the first synchronization information, but waits for a random duration (which is not limited to a specific duration). After waiting for the random duration, the first terminal device determines, based on synchronization information of the first terminal device (the first synchronization information) and received synchronization information of the second terminal device (the third synchronization information), whether the first terminal device and the second terminal device have implemented signal synchronization after the random duration.

When the first synchronization information is the same as the third synchronization information, the first terminal device and the second terminal device have implemented signal synchronization, and the first terminal device does not need to synchronize with the second terminal device by using the second terminal device as a synchronization source.

When the first synchronization information is different from the third synchronization information, the first terminal device synchronizes with the second terminal device by using the second terminal device as a synchronization source.

The two terminal devices may simultaneously receive synchronization information sent by each other. To reduce a probability of synchronization failure because the two terminal devices simultaneously initiate synchronization, the first terminal device may wait for a first random duration after receiving the second synchronization information, and then determine, based on the received third synchronization information sent by the second terminal device, whether the first terminal device and the second terminal device have implemented signal synchronization. If the first terminal device and the second terminal device have not implemented signal synchronization, the first terminal device synchronizes with the second terminal device by using the second terminal device as a synchronization source, to complete signal synchronization. If the second terminal device completes signal synchronization with the first terminal device by using the first terminal device as a synchronization source within the random duration, the first synchronization information is the same as the third synchronization information, and the first terminal device does not need to synchronize with the second terminal device.

Similarly, the second terminal device waits for a second random duration after receiving the first synchronization information, and then determines, based on received fifth synchronization information sent by the first terminal device, whether the first terminal device and the second terminal device have implemented signal synchronization. If the first terminal device and the second terminal device have not implemented signal synchronization, the second terminal device synchronizes with the first terminal device by using the first terminal device as a synchronization source, to complete signal synchronization. If the first terminal device completes signal synchronization with the second terminal device by using the second terminal device as a synchronization source within the random duration, the second synchronization information is the same as the fifth synchronization information, and the second terminal device does not need to synchronize with the first terminal device.

It should be understood that the first random duration is very probably unequal to the second random duration, so that the first terminal device and the second terminal device asynchronously initiate synchronization, to implement signal synchronization between the two terminal devices.

In conclusion, a difference between the method for signal synchronization provided in this application and a method for signal synchronization provided in conventional technologies lies in that, in this application, when the first terminal device and the second terminal device are synchronized, the first terminal device does not synchronize with the second terminal device by using the second terminal device as a synchronization source. This reduces a probability of communication interruption caused by synchronization source switching when the first terminal device and the second terminal device are synchronized.

With reference to the first aspect, in some implementations of the first aspect, that the first synchronization information is different from the second synchronization information includes: An identifier of the first synchronization signal is different from an identifier of the second synchronization signal, and/or a parameter included in the first master information block is different from a parameter included in the second master information block. That the first synchronization information is different from the third synchronization information includes: An identifier of the first synchronization signal is different from an identifier of the third synchronization signal, and/or a parameter included in the first master information block is different from a parameter included in the third master information block.

In certain embodiments, the first terminal device may determine the identifier of the second synchronization signal based on the second synchronization information. The first synchronization information is different from the second synchronization information when the identifier of the first synchronization signal is different from the identifier of the second synchronization signal, and/or the parameter included in the first master information block is not completely the same as the parameter included in the second master information block.

Similarly, the first terminal device may determine the identifier of the third synchronization signal based on the third synchronization information. The first synchronization information is different from the third synchronization information when the identifier of the first synchronization signal is different from the identifier of the third synchronization signal, and/or the parameter included in the first master information block is not completely the same as the parameter included in the third master information block.

With reference to the first aspect, in some implementations of the first aspect, after the first terminal device performs signal synchronization by using the second terminal device as a synchronization source, the method further includes: The first terminal device broadcasts fourth synchronization information when signal quality of the fourth synchronization information received by the first terminal device from the second terminal device is less than or equal to a preset threshold, where the fourth synchronization information includes the second synchronization information or the third synchronization information.

In certain embodiments, after the first terminal device performs signal synchronization by using the second terminal device as a synchronization source, and signal quality of the second synchronization information or the third synchronization information received by the first terminal device from the second terminal device is less than or equal to the preset threshold, the first terminal device sends the synchronization information (the third synchronization information) of the synchronization source (the second terminal device). In other words, the first terminal device may be understood as a relay device of the second terminal device, to assist the second terminal device in sending the synchronization information of the second terminal device to an external device.

With reference to the first aspect, in some implementations of the first aspect, that the first terminal device remains as the terminal device without selected synchronization reference when the first synchronization information is the same as the second synchronization information includes: The first terminal device broadcasts the first synchronization information when the first synchronization information is the same as the second synchronization information and the signal quality of the second synchronization information received by the first terminal device is greater than the preset threshold. That the first terminal device remains as the terminal device without selected synchronization reference when the first synchronization information is the same as the third synchronization information includes: The first terminal device broadcasts the first synchronization information when the first synchronization information is the same as the third synchronization information and the signal quality of the third synchronization information received by the first terminal device is greater than the preset threshold.

In certain embodiments, that the first terminal device remains as the terminal device without selected synchronization reference when the first synchronization information is the same as the second synchronization information or when the first synchronization information is the same as the third synchronization information may be embodied as that the first terminal device still broadcasts the synchronization information of the first terminal device, because the second terminal device has synchronized with the first terminal device by using the first terminal device as a synchronization source in this case. In other words, the synchronization information sent by the second terminal device is the synchronization information of the synchronization source (the first terminal device). The first terminal device only needs to continuously broadcast the synchronization information of the first terminal device, to enable the second terminal device to continuously learn existence of the synchronization source.

Further, according to the method for signal synchronization provided in this embodiment, even if the second terminal device has synchronized with the first terminal device, the second terminal device still sends the second synchronization information on a premise that received energy of the first synchronization information broadcast by the first terminal device and received by the second terminal device is less than a preset threshold (for example, a threshold syncTxThreshOoC specified in the current 3GPP TS 36.331 V15.7.0 technical specification). When received energy of the second synchronization information sent by the second terminal device and received by the first terminal device is greater than or equal to the preset threshold, different from conventional technologies, in this application, the first terminal device does not directly initiate synchronization when receiving the second synchronization information whose energy is greater than or equal to the preset threshold, but first determines whether the first terminal device has synchronized with the second terminal device, to avoid synchronization source switching as much as possible.

With reference to the first aspect, in some implementations of the first aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal. The third synchronization signal includes a third PSSS and a third SSSS, and the third PSSS and the third SSSS are used to determine the identifier of the third synchronization signal.

The foregoing synchronization signals include the PSSSs and the SSSSs, and the PSSSs and the SSSSs can be used to determine the identifiers of the synchronization signals.

With reference to the first aspect, in some implementations of the first aspect, the first terminal device includes a first vehicle or a chip or a circuit disposed in the first vehicle, and the second terminal device includes a second vehicle or a chip or a circuit disposed in the second vehicle.

This embodiment may be applied to a V2V scenario.

With reference to the first aspect, in some implementations of the first aspect, the first master information block includes at least one of the following parameters: bandwidth information of the first terminal device, time division duplex TDD information of the first terminal device, reserved bit information (for example, reserved information) of the first terminal device, or coverage area information (for example, incoverage information) of the first terminal device. The second master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device. The third master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device. The parameter included in the third master information block is a parameter related to the second terminal device that is included in the third synchronization information received by the first terminal device after the first terminal device receives the second synchronization information and waits for the random duration.

In certain embodiments, a master information block sent by a terminal device includes information related to the terminal device, so that another terminal device that receives the master information block can learn the information related to the terminal device. This implements signal synchronization.

According to a second aspect of the present disclosure, a method for signal synchronization is provided. The method for signal synchronization may be performed by a wireless communication apparatus in a first terminal device, and the first terminal device is a terminal device without selected synchronization reference.

The method for signal synchronization includes: The wireless communication apparatus enables the first terminal device to broadcast a first synchronization signal and a first master information block; and the wireless communication apparatus enables the first terminal device to receive second synchronization information from a second terminal device, where the second synchronization information includes a second synchronization signal and a second master information block.

That the wireless communication apparatus enables the first terminal device to broadcast the first synchronization information may be that the wireless communication apparatus enables a transceiver in the first terminal device to implement a function of broadcasting the first synchronization information, or the wireless communication apparatus integrates a transceiver, and the wireless communication apparatus enables the transceiver to implement a function of broadcasting the first synchronization information.

Similarly, that the wireless communication apparatus enables the first terminal device to receive the second synchronization information from the second terminal device may be that the wireless communication apparatus enables a transceiver in the first terminal device or a transceiver integrated in the wireless communication apparatus to implement a function of receiving the second synchronization information from the second terminal device.

The wireless communication apparatus enables the first terminal device to remain as the terminal device without selected synchronization reference when the first synchronization information is the same as the second synchronization information. The wireless communication apparatus enables the first terminal device to perform signal synchronization by using the second terminal device as a synchronization source when the first synchronization information is different from the second synchronization information, or when the first synchronization information is different from the second synchronization information, the wireless communications apparatus enables the first terminal device to receive third synchronization information from the second terminal device after receiving the second synchronization information and waiting for a random duration, where the third synchronization information includes a third synchronization signal and a third master information block. When the first synchronization information is different from the third synchronization information, the wireless communication apparatus enables the first terminal device to perform signal synchronization by using the second terminal device as a synchronization source. When the first synchronization information is the same as the third synchronization information, the wireless communication apparatus enables the first terminal device to remain as the terminal device without selected synchronization reference.

The wireless communication apparatus may be a baseband processor or a system on chip (SoC) disposed in the first terminal device. A specific form of the wireless communication apparatus is not limited in this application.

According to the method for signal synchronization provided in this embodiment, the built-in wireless communication apparatus of the first terminal device in a self-synchronizing state enables the first terminal device to broadcast the first synchronization information of the first terminal device and detect the second synchronization information sent by another terminal device. Different from an existing solution in which a terminal device in a self-synchronizing state detects synchronization information, in this application, the wireless communication apparatus enables the first terminal device to skip directly synchronizing to the second terminal device by using the second terminal device as a synchronization source after detecting the second synchronization information, but first determines whether the first synchronization information is the same as the second synchronization information. When the first synchronization information is the same as the second synchronization information, it is determined that the first terminal device and the second terminal device have implemented signal synchronization, and the wireless communication apparatus does not need to enable first terminal device to synchronize with the second terminal device by using the second terminal device as a synchronization source. When the first synchronization information is different from the second synchronization information, it is determined that the first terminal device and the second terminal device have not implemented signal synchronization.

In a possible implementation, when the first synchronization information is different from the second synchronization information, the wireless communication apparatus enables the first terminal device to synchronize with the second terminal device by using the second terminal device as a synchronization source.

In another possible implementation, when the first synchronization information is different from the second synchronization information, the wireless communication apparatus enables the first terminal device to skip immediately synchronizing to the second terminal device by using the second terminal device as a synchronization source at a moment of detecting the second synchronization information and learning that the second synchronization information is different from the first synchronization information, but waits for a random duration. After waiting for the random duration, the wireless communication apparatus determines, based on synchronization information of the first terminal device (the first synchronization information) and received synchronization information of the second terminal device (the third synchronization information), whether the first terminal device and the second terminal device have implemented signal synchronization after the random duration.

When the first synchronization information is the same as the third synchronization information, the first terminal device and the second terminal device have implemented signal synchronization, and the wireless communication apparatus does not need to enable the first terminal device to synchronize with the second terminal device by using the second terminal device as a synchronization source.

When the first synchronization information is different from the third synchronization information, the wireless communication apparatus enables the first terminal device to synchronize with the second terminal device by using the second terminal device as a synchronization source.

The two terminal devices may simultaneously receive synchronization information sent by each other. To reduce a probability of synchronization failure because the two terminal devices simultaneously initiate synchronization, the wireless communication apparatus may enable the first terminal device to wait for a first random duration after the first terminal receives the second synchronization information, and then determine, based on the received third synchronization information sent by the second terminal device, whether the first terminal device and the second terminal device have implemented signal synchronization. If the first terminal device and the second terminal device have not implemented signal synchronization, the wireless communication apparatus enables the first terminal device to synchronize with the second terminal device by using the second terminal device as a synchronization source, to complete signal synchronization. If the second terminal device completes signal synchronization with the first terminal device by using the first terminal device as a synchronization source within the random duration, the first synchronization information is the same as the third synchronization information, and the wireless communication apparatus does not need to enable the first terminal device to synchronize with the second terminal device.

Similarly, the second terminal device waits for a second random duration after receiving the first synchronization information, and then determines, based on received fifth synchronization information sent by the first terminal device, whether the first terminal device and the second terminal device have implemented signal synchronization. If the first terminal device and the second terminal device have not implemented signal synchronization, the second terminal device synchronizes with the first terminal device by using the first terminal device as a synchronization source, to complete signal synchronization. If the first terminal device completes signal synchronization with the second terminal device by using the second terminal device as a synchronization source within the random duration, the second synchronization information is the same as the fifth synchronization information, and the second terminal device does not need to synchronize with the first terminal device.

It should be understood that the first duration is unequal to the second duration at a high probability, so that the first terminal device and the second terminal device asynchronously initiate synchronization, to implement signal synchronization between the two terminal devices.

To be specific, a difference between the method for signal synchronization provided in this application and a method for signal synchronization provided in conventional technologies lies in that, when the first terminal device and the second terminal device are synchronized, the wireless communication apparatus does not enable the first terminal device to synchronize with the second terminal device by using the second terminal device as a synchronization source. This reduces a probability of communication interruption caused by synchronization source switching when the first terminal device and the second terminal device are synchronized.

With reference to the second aspect, in some implementations of the second aspect, that the first synchronization information is different from the second synchronization information includes: An identifier of the first synchronization signal is different from an identifier of the second synchronization signal, and/or a parameter included in the first master information block is different from a parameter included in the second master information block. That the first synchronization information is different from the third synchronization information includes: An identifier of the first synchronization signal is different from an identifier of the third synchronization signal, and/or a parameter included in the first master information block is different from a parameter included in the third master information block.

In certain embodiments, the wireless communication apparatus may determine the identifier of the second synchronization signal based on the second synchronization information. The first synchronization information is different from the second synchronization information when the identifier of the first synchronization signal is different from the identifier of the second synchronization signal, and/or the parameter included in the first master information block is not completely the same as the parameter included in the second master information block.

Similarly, the wireless communication apparatus may determine the identifier of the third synchronization signal based on the third synchronization information. The first synchronization information is different from the third synchronization information when the identifier of the first synchronization signal is different from the identifier of the third synchronization signal, and/or the parameter included in the first master information block is not completely the same as the parameter included in the third master information block.

With reference to the second aspect, in some implementations of the second aspect, after the wireless communication apparatus enables the first terminal device to perform signal synchronization by using the second terminal device as a synchronization source, the method further includes: The wireless communication apparatus enables the first terminal device to broadcast fourth synchronization information when signal quality of the fourth synchronization information received by the first terminal device from the second terminal device is less than or equal to a preset threshold, where the fourth synchronization information includes the second synchronization information or the third synchronization information.

In certain embodiments, after the first terminal device performs signal synchronization by using the second terminal device as a synchronization source, and signal quality of the second synchronization information or the third synchronization information received by the first terminal device from the second terminal device is less than or equal to the preset threshold, the wireless communication apparatus enables the first terminal device to send the synchronization information (the third synchronization information) of the synchronization source (the second terminal device). In other words, the first terminal device may be understood as a relay device of the second terminal device, to assist the second terminal device in sending the synchronization information of the second terminal device to an external device.

With reference to the second aspect, in some implementations of the second aspect, that the wireless communication apparatus enables the first terminal device to remain as the terminal device without selected synchronization reference when the first synchronization information is the same as the second synchronization information includes: The wireless communication apparatus enables the first terminal device to broadcast the first synchronization information when the first synchronization information is the same as the second synchronization information and the signal quality of the second synchronization information received by the first terminal device is greater than the preset threshold. That the wireless communication apparatus enables the first terminal device to remain as the terminal device without selected synchronization reference when the first synchronization information is the same as the third synchronization information includes: The wireless communication apparatus enables the first terminal device to broadcast the first synchronization information when the first synchronization information is the same as the third synchronization information and the signal quality of the third synchronization information received by the first terminal device is greater than the preset threshold.

In certain embodiments, that the first terminal device remains as the terminal device without selected synchronization reference when the first synchronization information is the same as the second synchronization information or when the first synchronization information is the same as the third synchronization information may be embodied as that the first terminal device still broadcasts the synchronization information of the first terminal device, because the second terminal device has synchronized with the first terminal device by using the first terminal device as a synchronization source in this case. In other words, the synchronization information sent by the second terminal device is the synchronization information of the synchronization source (the first terminal device). The first terminal device only needs to continuously broadcast the synchronization information of the first terminal device, to enable the second terminal device to continuously learn existence of the synchronization source.

Further, according to the method for signal synchronization provided in this embodiment, even if the second terminal device has synchronized with the first terminal device, the second terminal device still sends the second synchronization information on a premise that received energy of the first synchronization information broadcast by the first terminal device and received by the second terminal device is less than a preset threshold. When received energy of the second synchronization information sent by the second terminal device and received by the first terminal device is greater than or equal to the preset threshold, different from the conventional technologies, in this application, the wireless communication apparatus enables the first terminal device to skip directly initiating synchronization when receiving the second synchronization information whose energy is greater than or equal to the preset threshold, but first determines whether the first terminal device has synchronized with the second terminal device, to avoid synchronization source switching as much as possible.

With reference to the second aspect, in some implementations of the second aspect, the first terminal device includes a first vehicle or a chip or a circuit disposed in the first vehicle, and the second terminal device includes a second vehicle or a chip or a circuit disposed in the second vehicle.

This embodiment may be applied to a V2V scenario.

With reference to the second aspect, in some implementations of the second aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal. The third synchronization signal includes a third PSSS and a third SSSS, and the third PSSS and the third SSSS are used to determine the identifier of the third synchronization signal.

The foregoing synchronization signals include the PSSSs and the SSSSs, and the PSSSs and the SSSSs can be used to determine the identifiers of the synchronization signals.

With reference to the second aspect, in some implementations of the second aspect, the first master information block includes at least one of the following parameters: bandwidth information of the first terminal device, time division duplex TDD information of the first terminal device, reserved bit information (for example, reserved information) of the first terminal device, or coverage area information (for example, incoverage information) of the first terminal device. The second master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device. The third master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device. The parameter included in the third master information block is a parameter related to the second terminal device that is included in the third synchronization information received by the first terminal device after the first terminal device receives the second synchronization information and waits for the random duration.

In certain embodiments, a master information block sent by a terminal device includes information related to the terminal device, so that another terminal device that receives the master information block can learn the information related to the terminal device. This implements signal synchronization.

According to a third aspect of the present disclosure, a method for signal synchronization is provided. The method for signal synchronization may be performed by a first terminal device, or may be performed by a chip or a circuit disposed in the first terminal device. This is not limited in this application. For ease of description, that the method for signal synchronization is performed by the first terminal device may be used as an example for description.

The method for signal synchronization includes: A first terminal device broadcasts first synchronization information, where the first synchronization information includes a first synchronization signal and a first master information block, and the first terminal device is a terminal device without selected synchronization reference; the first terminal device receives second synchronization information from a second terminal device, where the second synchronization information includes a second synchronization signal and a second master information block; and the first terminal device remains as the terminal device without selected synchronization reference when the first synchronization information is the same as the second synchronization information; or the first terminal device performs signal synchronization by using the second terminal device as a synchronization source when the first synchronization information is different from the second synchronization information.

According to the method for signal synchronization provided in this embodiment, the first terminal device in a self-synchronizing state also detects the second synchronization information sent by another terminal device (the second terminal device is used as an example) when broadcasting the first synchronization information of the first terminal device. Different from an existing solution in which a terminal device in a self-synchronizing state detects synchronization information, in this application, the first terminal device does not directly synchronize with the second terminal device by using the second terminal device as a synchronization source after detecting the second synchronization information, but first determines whether the first synchronization information is the same as the second synchronization information. When the first synchronization information is the same as the second synchronization information, the first terminal device and the second terminal device have implemented signal synchronization, and the first terminal device does not need to synchronize with the second terminal device by using the second terminal device as a synchronization source. When the first synchronization information is different from the second synchronization information, the first terminal device synchronizes with the second terminal device by using the second terminal device as a synchronization source.

A difference between the method for signal synchronization provided in this application and a method for signal synchronization provided in conventional technologies lies in that, in this application, when the first terminal device and the second terminal device are synchronized, the first terminal device does not synchronize with the second terminal device by using the second terminal device as a synchronization source. This reduces a probability of communication interruption caused by synchronization source switching when the first terminal device and the second terminal device are synchronized.

With reference to the third aspect, in some implementations of the third aspect, that the first synchronization information is different from the second synchronization information includes: An identifier of the first synchronization signal is different from an identifier of the second synchronization signal, and/or a parameter included in the first master information block is different from a parameter included in the second master information block.

In certain embodiments, the first terminal device may determine the identifier of the second synchronization signal based on the second synchronization information. The first synchronization information is different from the second synchronization information when the identifier of the first synchronization signal is different from the identifier of the second synchronization signal, and/or the parameter included in the first master information block is not completely the same as the parameter included in the second master information block.

With reference to the third aspect, in some implementations of the third aspect, after the first terminal device performs signal synchronization by using the second terminal device as a synchronization source, the method further includes: The first terminal device broadcasts fourth synchronization information when signal quality of the fourth synchronization information received by the first terminal device from the second terminal device is less than or equal to a preset threshold, where the fourth synchronization information includes the second synchronization information or the third synchronization information.

In certain embodiments, after the first terminal device performs signal synchronization by using the second terminal device as a synchronization source, and signal quality of the second synchronization information or the third synchronization information received by the first terminal device from the second terminal device is less than or equal to the preset threshold, the first terminal device sends the synchronization information (the second synchronization information) of the synchronization source (the second terminal device). In other words, the first terminal device may be understood as a relay device of the second terminal device, to assist the second terminal device in sending the synchronization information of the second terminal device to an external device.

With reference to the third aspect, in some implementations of the third aspect, that the first terminal device remains as the terminal device without selected synchronization reference when the first synchronization information is the same as the second synchronization information includes: The first terminal device broadcasts the first synchronization information when the first synchronization information is the same as the second synchronization information and the signal quality of the second synchronization information received by the first terminal device is greater than the preset threshold.

In certain embodiments, that the first terminal device remains as the terminal device without selected synchronization reference when the first synchronization information is the same as the second synchronization information may be embodied as that the first terminal device still broadcasts the synchronization information of the first terminal device, because the second terminal device has synchronized with the first terminal device by using the first terminal device as a synchronization source in this case. In other words, the synchronization information sent by the second terminal device is the synchronization information of the synchronization source (the first terminal device). The first terminal device only needs to continuously broadcast the synchronization information of the first terminal device, to enable the second terminal device to continuously learn existence of the synchronization source.

Further, according to the method for signal synchronization provided in this embodiment, even if the second terminal device has synchronized with the first terminal device, the second terminal device still sends the second synchronization information on a premise that received energy of the first synchronization information broadcast by the first terminal device and received by the second terminal device is less than a preset threshold (for example, a threshold syncTxThreshOoC specified in the current 3GPP TS 36.331 V15.7.0 technical specification). When received energy of the second synchronization information sent by the second terminal device and received by the first terminal device is greater than or equal to the preset threshold, different from conventional technologies, in this application, the first terminal device does not directly initiate synchronization when receiving the second synchronization information whose energy is greater than or equal to the preset threshold, but first determines whether the first terminal device has synchronized with the second terminal device, to avoid synchronization source switching as much as possible.

With reference to the third aspect, in some implementations of the third aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal.

The foregoing synchronization signals include the PSSSs and the SSSSs, and the PSSSs and the SSSSs can be used to determine the identifiers of the synchronization signals.

With reference to the third aspect, in some implementations of the third aspect, the first terminal device includes a first vehicle or a chip or a circuit disposed in the first vehicle, and the second terminal device includes a second vehicle or a chip or a circuit disposed in the second vehicle.

This embodiment may be applied to a V2V scenario.

With reference to the third aspect, in some implementations of the third aspect, the first master information block includes at least one of the following parameters: bandwidth information of the first terminal device, time division duplex TDD information of the first terminal device, reserved bit information (for example, reserved information) of the first terminal device, or coverage area information (for example, incoverage information) of the first terminal device. The second master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device.

In certain embodiments, a master information block sent by a terminal device includes information related to the terminal device, so that another terminal device that receives the master information block can learn the information related to the terminal device. This implements signal synchronization.

According to a fourth aspect of the present disclosure, a method for signal synchronization is provided. The method for signal synchronization may be performed by a wireless communication apparatus in a first terminal device, and the first terminal device is a terminal device without selected synchronization reference.

The method for signal synchronization includes: The wireless communication apparatus enables the first terminal device to broadcast a first synchronization signal and a first master information block; and the wireless communication apparatus enables the first terminal device to receive second synchronization information from a second terminal device, where the second synchronization information includes a second synchronization signal and a second master information block.

That the wireless communication apparatus enables the first terminal device to broadcast the first synchronization information may be that the wireless communication apparatus enables a transceiver in the first terminal device to implement a function of broadcasting the first synchronization information, or the wireless communication apparatus integrates a transceiver, and the wireless communication apparatus enables the transceiver to implement a function of broadcasting the first synchronization information.

Similarly, that the wireless communication apparatus enables the first terminal device to receive the second synchronization information from the second terminal device may be that the wireless communication apparatus enables a transceiver in the first terminal device or a transceiver integrated in the wireless communication apparatus to implement a function of receiving the second synchronization information from the second terminal device.

The wireless communication apparatus enables the first terminal device to remain as the terminal device without selected synchronization reference when the first synchronization information is the same as the second synchronization information. The wireless communication apparatus enables the first terminal device to perform signal synchronization by using the second terminal device as a synchronization source when the first synchronization information is different from the second synchronization information.

The wireless communication apparatus may be a baseband processor or an SoC disposed in the first terminal device. A specific form of the wireless communication apparatus is not limited in this application.

According to the method for signal synchronization provided in this embodiment, the built-in wireless communication apparatus of the first terminal device in a self-synchronizing state enables the first terminal device to broadcast the first synchronization information of the first terminal device and detect the second synchronization information sent by another terminal device. Different from an existing solution in which a terminal device in a self-synchronizing state detects synchronization information, in this application, the wireless communication apparatus enables the first terminal device to skip directly synchronizing to the second terminal device by using the second terminal device as a synchronization source after detecting the second synchronization information, but first determines whether the first synchronization information is the same as the second synchronization information. When the first synchronization information is the same as the second synchronization information, it is determined that the first terminal device and the second terminal device have implemented signal synchronization, and the wireless communication apparatus does not need to enable first terminal device to synchronize with the second terminal device by using the second terminal device as a synchronization source. When the first synchronization information is different from the second synchronization information, it is determined that the first terminal device and the second terminal device have not implemented signal synchronization, and the wireless communication apparatus enables the first terminal device to synchronize with the second terminal device by using the second terminal device as a synchronization source.

A difference between the method for signal synchronization provided in this application and a method for signal synchronization provided in conventional technologies lies in that, when the first terminal device and the second terminal device are synchronized, the wireless communication apparatus does not enable the first terminal device to synchronize with the second terminal device by using the second terminal device as a synchronization source. This reduces a probability of communication interruption caused by synchronization source switching when the first terminal device and the second terminal device are synchronized.

With reference to the fourth aspect, in some implementations of the fourth aspect, that the first synchronization information is different from the second synchronization information includes: An identifier of the first synchronization signal is different from an identifier of the second synchronization signal, and/or a parameter included in the first master information block is different from a parameter included in the second master information block.

In certain embodiments, the wireless communication apparatus may determine the identifier of the second synchronization signal based on the second synchronization information. The first synchronization information is different from the second synchronization information when the identifier of the first synchronization signal is different from the identifier of the second synchronization signal, and/or the parameter included in the first master information block is not completely the same as the parameter included in the second master information block.

With reference to the fourth aspect, in some implementations of the fourth aspect, after the wireless communication apparatus enables the first terminal device to perform signal synchronization by using the second terminal device as a synchronization source, the method further includes: The wireless communication apparatus enables the first terminal device to broadcast fourth synchronization information when signal quality of the fourth synchronization information received by the first terminal device from the second terminal device is less than or equal to a preset threshold, where the fourth synchronization information includes the second synchronization information or the third synchronization information.

In certain embodiments, after the first terminal device performs signal synchronization by using the second terminal device as a synchronization source, and signal quality of the second synchronization information or the third synchronization information received by the first terminal device from the second terminal device is less than or equal to the preset threshold, the wireless communication apparatus enables the first terminal device to send the synchronization information (the second synchronization information) of the synchronization source (the second terminal device). In other words, the first terminal device may be understood as a relay device of the second terminal device, to assist the second terminal device in sending the synchronization information of the second terminal device to an external device.

With reference to the fourth aspect, in some implementations of the fourth aspect, that the wireless communication apparatus enables the first terminal device to remain as the terminal device without selected synchronization reference when the first synchronization information is the same as the second synchronization information includes: The wireless communication apparatus enables the first terminal device to broadcast the first synchronization information when the first synchronization information is the same as the second synchronization information and the signal quality of the second synchronization information received by the first terminal device is greater than the preset threshold.

In certain embodiments, that the first terminal device remains as the terminal device without selected synchronization reference when the first synchronization information is the same as the second synchronization information may be embodied as that the first terminal device still broadcasts the synchronization information of the first terminal device, because the second terminal device has synchronized with the first terminal device by using the first terminal device as a synchronization source in this case. In other words, the synchronization information sent by the second terminal device is the synchronization information of the synchronization source (the first terminal device). The first terminal device only needs to continuously broadcast the synchronization information of the first terminal device, to enable the second terminal device to continuously learn existence of the synchronization source.

Further, according to the method for signal synchronization provided in this embodiment, even if the second terminal device has synchronized with the first terminal device, the second terminal device still sends the second synchronization information on a premise that received energy of the first synchronization information broadcast by the first terminal device and received by the second terminal device is less than a preset threshold. When received energy of the second synchronization information sent by the second terminal device and received by the first terminal device is greater than or equal to the preset threshold, different from conventional technologies, in this application, the wireless communication apparatus enables the first terminal device to skip directly initiating synchronization when receiving the second synchronization information whose energy is greater than or equal to the preset threshold, but first determines whether the first terminal device has synchronized with the second terminal device, to avoid synchronization source switching as much as possible.

With reference to the fourth aspect, in some implementations of the fourth aspect, the first terminal device includes a first vehicle or a chip or a circuit disposed in the first vehicle, and the second terminal device includes a second vehicle or a chip or a circuit disposed in the second vehicle.

This embodiment may be applied to a V2V scenario.

With reference to the fourth aspect, in some implementations of the fourth aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal.

The foregoing synchronization signals include the PSSSs and the SSSSs, and the PSSSs and the SSSSs can be used to determine the identifiers of the synchronization signals.

With reference to the fourth aspect, in some implementations of the fourth aspect, the first master information block includes at least one of the following parameters: bandwidth information of the first terminal device, time division duplex TDD information of the first terminal device, reserved bit information (for example, reserved information) of the first terminal device, or coverage area information (for example, incoverage information) of the first terminal device. The second master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device.

In certain embodiments, a master information block sent by a terminal device includes information related to the terminal device, so that another terminal device that receives the master information block can learn the information related to the terminal device. This implements signal synchronization.

According to a fifth aspect of the present disclosure, an apparatus for signal synchronization is provided. The apparatus for signal synchronization includes a processor, configured to implement the functions of the first terminal device in the methods described in the first aspect and the third aspect.

Optionally, the apparatus for signal synchronization may further include a memory. The memory is coupled to the processor, and the processor is configured to implement the functions of the first terminal device in the method described in the first aspect.

In a possible implementation, the memory is configured to store program instructions and data. The memory is coupled to the processor. The processor may invoke and execute the program instructions stored in the memory, to implement the functions of the first terminal device in the methods described in the first aspect and the third aspect.

Optionally, the apparatus for signal synchronization may further include a communication interface. The communication interface is for communication between the apparatus for signal synchronization and another device. When the apparatus for signal synchronization is a terminal device, a transceiver may be a communication interface or an input/output interface.

In an example embodiment, that the apparatus for signal synchronization includes the processor and the communication interface configured to implement the functions of the first terminal device in the methods described in the first aspect and the third aspect may include:

The processor performs external communication through the communication interface; and the processor is configured to run a computer program, so that the apparatus is enabled to implement any method described in the first aspect and the third aspect.

It may be understood that the external communication may be communication with an object other than the processor, or an object other than the apparatus.

In another implementation, when the apparatus for signal synchronization is a chip or a chip system, the communication interface may be an input/output interface, an interface circuit, an output circuit, an input circuit, a pin, a related circuit, or the like in the chip or the chip system. The processor may alternatively be embodied as a processing circuit or a logic circuit.

According to a sixth aspect of the present disclosure, an apparatus for signal synchronization is provided. The apparatus for signal synchronization includes a processor, configured to implement the functions of the wireless communication apparatus in the methods described in the second aspect and the fourth aspect.

Optionally, the apparatus for signal synchronization may further include a memory. The memory is coupled to the processor, and the processor is configured to implement the functions of the wireless communication apparatus in the methods described in the second aspect and the fourth aspect.

In a possible implementation, the memory is configured to store program instructions and data. The memory is coupled to the processor. The processor may invoke and execute the program instructions stored in the memory, to implement the functions of the wireless communication apparatus in the methods described in the second aspect and the fourth aspect.

Optionally, the apparatus for signal synchronization may further include a communication interface. The communication interface is for communication between the apparatus for signal synchronization and another device. When the apparatus for signal synchronization is a terminal device, a transceiver may be a communication interface or an input/output interface.

In an example embodiment, that the apparatus for signal synchronization includes the processor and the communication interface configured to implement the functions of the wireless communication apparatus in the methods described in the second aspect and the fourth aspect may include:

The processor performs external communication through the communication interface; and the processor is configured to run a computer program, so that the apparatus is enabled to implement any method described in the second aspect and the fourth aspect.

It may be understood that the external communication may be communication with an object other than the processor, or an object other than the apparatus.

In another implementation, when the apparatus for signal synchronization is a chip or a chip system, the communication interface may be an input/output interface, an interface circuit, an output circuit, an input circuit, a pin, a related circuit, or the like in the chip or the chip system. The processor may alternatively be embodied as a processing circuit or a logic circuit.

According to a seventh aspect of the present disclosure, a computer-readable storage medium is provided. The computer-readable storage medium stores a computer program. When the computer program is executed by a communication apparatus, the communication apparatus is enabled to implement the method according to any one of the first aspect to the fourth aspect, and the possible implementations of the first aspect to the fourth aspect.

According to an eighth aspect of the present disclosure, a computer program product including instructions is provided. When the instructions are executed by a computer, the computer is enabled to implement the method according to any one of the first aspect to the fourth aspect, and the possible implementations of the first aspect to the fourth aspect.

According to a ninth aspect of the present disclosure, a chip is provided, including a communication interface, a memory, and a processor. The memory is configured to store a computer program, and the processor is configured to read and execute the computer program stored in the memory, so that the chip is enabled to implement the method according to any one of the first aspect to the fourth aspect, and the possible implementations of the first aspect to the fourth aspect. The chip includes an SoC, a baseband chip, or a baseband processor.

According to a tenth aspect of the present disclosure, a communication system is provided, including the apparatus for signal synchronization and the access network device that are shown in the fifth aspect.

According to an eleventh aspect of the present disclosure, an apparatus for signal synchronization is provided. The apparatus is used in a first terminal device, and the first terminal device is a terminal device without selected synchronization reference. The apparatus includes:

a transceiver, configured to: broadcast first synchronization information, where the first synchronization information includes a first synchronization signal and a first master information block; and receive second synchronization information from a second terminal device, where the second synchronization information includes a second synchronization signal and a second master information block; and a processor, configured to enable the first terminal device to remain as the terminal device without selected synchronization reference when the first synchronization information is the same as the second synchronization information.

The processor is further configured to enable the transceiver to receive third synchronization information from the second terminal device after the transceiver receives the second synchronization information and waits for a random duration when the first synchronization information is different from the second synchronization information, where the third synchronization information includes a third synchronization signal and a third master information block.

The processor is further configured to enable the first terminal device to remain as the terminal device without selected synchronization reference when the first synchronization information is the same as the third synchronization information.

The processor is configured to enable the first terminal device to perform signal synchronization by using the second terminal device as a synchronization source when the first synchronization information is different from the third synchronization information.

With reference to the eleventh aspect, in some implementations of the eleventh aspect, that the first synchronization information is different from the second synchronization information includes: An identifier of the first synchronization signal is different from an identifier of the second synchronization signal, and/or a parameter included in the first master information block is different from a parameter included in the second master information block. That the first synchronization information is different from the third synchronization information includes: An identifier of the first synchronization signal is different from an identifier of the third synchronization signal, and/or a parameter included in the first master information block is different from a parameter included in the third master information block.

With reference to the eleventh aspect, in some implementations of the eleventh aspect, after the first terminal device performs signal synchronization by using the second terminal device as a synchronization source, the transceiver is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

With reference to the eleventh aspect, in some implementations of the eleventh aspect, that the processor is configured to enable the first terminal device to remain as the terminal device without selected synchronization reference when the first synchronization information is the same as the second synchronization information includes: The processor is configured to enable the transceiver to broadcast the first synchronization information when the first synchronization information is the same as the second synchronization information and the signal quality of the second synchronization information received by the first terminal device is greater than the preset threshold. That the processor is configured to enable the first terminal device to remain as the terminal device without selected synchronization reference when the first synchronization information is the same as the third synchronization information includes: The processor is configured to enable the transceiver to broadcast the first synchronization information when the first synchronization information is the same as the third synchronization information and the signal quality of the third synchronization information received by the first terminal device is greater than the preset threshold.

With reference to the eleventh aspect, in some implementations of the eleventh aspect, the first terminal device includes a first vehicle or a chip or a circuit disposed in the first vehicle, and the second terminal device includes a second vehicle or a chip or a circuit disposed in the second vehicle.

With reference to the eleventh aspect, in some implementations of the eleventh aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal. The third synchronization signal includes a third PSSS and a third SSSS, and the third PSSS and the third SSSS are used to determine the identifier of the third synchronization signal.

With reference to the eleventh aspect, in some implementations of the eleventh aspect, the first master information block includes at least one of the following parameters:
bandwidth information of the first terminal device, time division duplex TDD information of the first terminal device, reserved bit information of the first terminal device, or coverage area information of the first terminal device.

The second master information block includes at least one of the following parameters:
bandwidth information of the second terminal device, time division duplex TDD information of the second terminal device, reserved bit information of the second terminal device, or coverage area information of the second terminal device.

The third master information block includes at least one of the following parameters:
bandwidth information of the second terminal device, time division duplex TDD information of the second terminal device, reserved bit information (for example, reserved information) of the second terminal device, or coverage area information (for example, incoverage information) of the second terminal device.

The parameter included in the third master information block is a parameter related to the second terminal device that is included in the third synchronization information received by the first terminal device after the first terminal device receives the second synchronization information and waits for the random duration.

According to a twelfth aspect of the present disclosure, a first terminal device is provided. The first terminal device is a terminal device without selected synchronization reference. The first terminal device includes:
a sending unit, configured to broadcast first synchronization information, where the first synchronization information includes a first synchronization signal and a first master information block;
a receiving unit, configured to receive second synchronization information from a second terminal device, where the second synchronization information includes a second synchronization signal and a second master information block; and
a processing unit, configured to enable the first terminal device to remain as the terminal device without selected synchronization reference when the first synchronization information is the same as the second synchronization information.

The processing unit is further configured to enable the receiving unit to receive third synchronization information from the second terminal device after the receiving unit receives the second synchronization information and waits for a random duration when the first synchronization information is different from the second synchronization information, where the third synchronization information includes a third synchronization signal and a third master information block.

The processing unit is further configured to enable the first terminal device to remain as the terminal device without selected synchronization reference when the first synchronization information is the same as the third synchronization information.

The processing unit is configured to enable the first terminal device to perform signal synchronization by using the second terminal device as a synchronization source when the first synchronization information is different from the third synchronization information.

With reference to the twelfth aspect, in some implementations of the twelfth aspect, that the first synchronization information is different from the second synchronization information includes: An identifier of the first synchronization signal is different from an identifier of the second synchronization signal, and/or a parameter included in the first master information block is different from a parameter included in the second master information block. That the first synchronization information is different from the third synchronization information includes: An identifier of the first synchronization signal is different from an identifier of the third synchronization signal, and/or a parameter included in the first master information block is different from a parameter included in the third master information block.

With reference to the twelfth aspect, in some implementations of the twelfth aspect, after the first terminal device performs signal synchronization by using the second terminal device as a synchronization source, the sending unit is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

With reference to the twelfth aspect, in some implementations of the twelfth aspect, that the processing unit is configured to enable the first terminal device to remain as the terminal device without selected synchronization reference when the first synchronization information is the same as the second synchronization information includes:

The processing unit is configured enable the sending unit to broadcast the first synchronization information when the first synchronization information is the same as the second synchronization information and signal quality of the second synchronization information received by the first terminal device is greater than the preset threshold.

That the processing unit is configured to enable the first terminal device to remain as the terminal device without selected synchronization reference when the first synchronization information is the same as the third synchronization information includes:

The processing unit is configured to enable the sending unit to broadcast the first synchronization information when the first synchronization information is the same as the third synchronization information and signal quality of the third synchronization information received by the first terminal device is greater than the preset threshold.

With reference to the twelfth aspect, in some implementations of the twelfth aspect, the first terminal device includes a first vehicle or a chip or a circuit disposed in the first vehicle, and the second terminal device includes a second vehicle or a chip or a circuit disposed in the second vehicle.

With reference to the twelfth aspect, in some implementations of the twelfth aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal. The third synchronization signal includes a third PSSS and a third SSSS, and the third PSSS and the third SSSS are used to determine the identifier of the third synchronization signal.

With reference to the twelfth aspect, in some implementations of the twelfth aspect, the first master information block includes at least one of the following parameters:

bandwidth information of the first terminal device, time division duplex TDD information of the first terminal device, reserved bit information of the first terminal device, or coverage area information of the first terminal device.

The second master information block includes at least one of the following parameters:

bandwidth information of the second terminal device, time division duplex TDD information of the second terminal device, reserved bit information of the second terminal device, or coverage area information of the second terminal device.

The third master information block includes at least one of the following parameters: bandwidth information of the second terminal device, time division duplex TDD information of the second terminal device, reserved bit information (for example, reserved information) of the second terminal device, or coverage area information (for example, incoverage information) of the second terminal device.

The parameter included in the third master information block is a parameter related to the second terminal device that is included in the third synchronization information received by the first terminal device after the first terminal device receives the second synchronization information and waits for the a random duration.

According to a thirteenth aspect of the present disclosure, an apparatus for signal synchronization is provided. The apparatus is used in a first terminal device, and the first terminal device is a terminal device without selected synchronization reference. The apparatus includes:

a transceiver, configured to: broadcast first synchronization information, where the first synchronization information includes a first synchronization signal and a first master information block; and receive second synchronization information from a second terminal device, where the second synchronization information includes a second synchronization signal and a second master information block; and a processor, configured to enable the first terminal device to remain as the terminal device without selected synchronization reference when the first synchronization information is the same as the second synchronization information.

The processor is further configured to enable the first terminal device to perform signal synchronization by using the second terminal device as a synchronization source when the first synchronization information is different from the second synchronization information.

With reference to the thirteenth aspect, in some implementations of the thirteenth aspect, that the first synchronization information is different from the second synchronization information includes: An identifier of the first synchronization signal is different from an identifier of the second synchronization signal, and/or a parameter included in the first master information block is different from a parameter included in the second master information block.

With reference to the thirteenth aspect, in some implementations of the thirteenth aspect, after the first terminal device performs signal synchronization by using the second terminal device as a synchronization source, the transceiver is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

With reference to the thirteenth aspect, in some implementations of the thirteenth aspect, that the processor is configured to enable the first terminal device to remain as the terminal device without selected synchronization reference when the first synchronization information is the same as the second synchronization information includes: The processor is configured to enable the transceiver to broadcast the first synchronization information when the first synchronization information is the same as the second synchronization information and the signal quality of the second synchronization information received by the first terminal device is greater than the preset threshold.

With reference to the thirteenth aspect, in some implementations of the thirteenth aspect, the first terminal device includes a first vehicle or a chip or a circuit disposed in the first vehicle, and the second terminal device includes a second vehicle or a chip or a circuit disposed in the second vehicle.

With reference to the thirteenth aspect, in some implementations of the thirteenth aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal.

With reference to the thirteenth aspect, in some implementations of the thirteenth aspect, the first master information block includes at least one of the following parameters:

bandwidth information of the first terminal device, time division duplex TDD information of the first terminal device, reserved bit information of the first terminal device, or coverage area information of the first terminal device.

The second master information block includes at least one of the following parameters:

bandwidth information of the second terminal device, time division duplex TDD information of the second terminal device, reserved bit information of the second terminal device, or coverage area information of the second terminal device.

According to a fourteenth aspect of the present disclosure, a first terminal device is provided. The first terminal device is a terminal device without selected synchronization reference. The first terminal device includes:

a sending unit, configured to broadcast first synchronization information, where the first synchronization information includes a first synchronization signal and a first master information block;

a receiving unit, configured to receive second synchronization information from a second terminal device, where the second synchronization information includes a second synchronization signal and a second master information block; and a processing unit, configured to enable the first terminal device to remain as the terminal device without selected synchronization reference when the first synchronization information is the same as the second synchronization information.

The processing unit is configured to enable the first terminal device to perform signal synchronization by using the second terminal device as a synchronization source when the first synchronization information is different from the second synchronization information.

With reference to the fourteenth aspect, in some implementations of the fourteenth aspect, that the first synchronization information is different from the second synchronization information includes: An identifier of the first synchronization signal is different from an identifier of the second synchronization signal, and/or a parameter included in the first master information block is different from a parameter included in the second master information block.

With reference to the fourteenth aspect, in some implementations of the fourteenth aspect, after the first terminal device performs signal synchronization by using the second terminal device as a synchronization source, the sending unit is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

With reference to the fourteenth aspect, in some implementations of the fourteenth aspect, that the processing unit is configured to enable the first terminal device to remain as the terminal device without selected synchronization reference when the first synchronization information is the same as the second synchronization information includes:

The processing unit is configured enable the sending unit to broadcast the first synchronization information when the first synchronization information is the same as the second synchronization information and signal quality of the second synchronization information received by the first terminal device is greater than the preset threshold.

With reference to the fourteenth aspect, in some implementations of the fourteenth aspect, the first terminal device includes a first vehicle or a chip or a circuit disposed in the first vehicle, and the second terminal device includes a second vehicle or a chip or a circuit disposed in the second vehicle.

With reference to the fourteenth aspect, in some implementations of the fourteenth aspect, the first synchronization signal includes a first primary sidelink synchronization signal PSSS and a first secondary sidelink synchronization signal SSSS, and the first PSSS and the first SSSS are used to determine the identifier of the first synchronization signal. The second synchronization signal includes a second PSSS and a second SSSS, and the second PSSS and the second SSSS are used to determine the identifier of the second synchronization signal.

With reference to the fourteenth aspect, in some implementations of the fourteenth aspect, the first master information block includes at least one of the following parameters:

bandwidth information of the first terminal device, time division duplex TDD information of the first terminal device, reserved bit information of the first terminal device, or coverage area information of the first terminal device.

The second master information block includes at least one of the following parameters:

bandwidth information of the second terminal device, time division duplex TDD information of the second terminal device, reserved bit information of the second terminal device, or coverage area information of the second terminal device.

According to the method, apparatus, and system for signal synchronization provided in embodiments of this application, the first terminal device without selected synchronization reference remains as the terminal device without selected synchronization reference after receiving synchronization information sent by the second terminal device, and determining that the first terminal device and the second terminal device have implemented signal synchronization. This reduces a probability of communication interruption between the first terminal device and the second terminal device caused by synchronization source switching, and improves communication performance between terminal devices.

DESCRIPTION OF EMBODIMENTS

Figure 1:
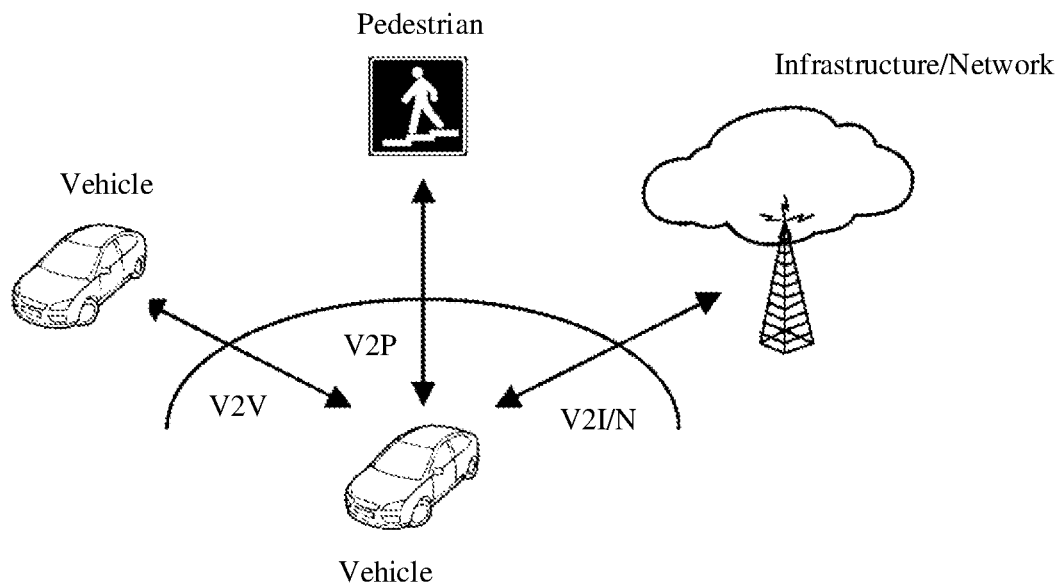
FIG. 1 is a schematic diagram of a V2X system.

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a worldwide interoperability for microwave access (WiMAX) communication system, a future 5th generation (5G) system, a new radio (NR) system, a device-to-device (D2D) system, a vehicle-to-everything system, a future network, or the like. The technical solutions provided in this application may be further applied to a future communication system, for example, a 6th generation mobile communication system.

The terminal device in embodiments of this application may be an access terminal, a subscriber unit, a subscriber station, a mobile station, a mobile console, a relay station, a remote station, a remote terminal, a mobile device, a user terminal, user equipment (UE), a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device or a vehicle in the Internet of Vehicles, or the like.

The network device in embodiments of this application may be any communication device that has a wireless transceiver function and that is configured to communicate with the terminal device. The device includes but is not limited to an evolved Node B (eNB), a radio network controller (RNC), a Node B (NB), a home NodeB (home evolved NodeB, HeNB, or home Node B, HNB), a baseband unit (BBU), an access point (AP) in a wireless fidelity (WIFI) system, a wireless relay node, a wireless backhaul node, a transmission point (TP), a transmission and reception point (TRP), a 5G system, for example, a gNB in an NR system, or a transmission point (TRP or TP), one or a group of antenna panels (including a plurality of antenna panels) of a base station in a 5G system, or a network node that constitutes a gNB or a transmission point, for example, a baseband unit (BBU) or a distributed unit (DU).

In some deployments, the network device in embodiments of this application may be a central unit (CU) or a distributed unit (DU), or the network device includes a CU and a DU. The gNB may further include an active antenna unit (AAU).

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software.

With continuous development of the society, popularity of vehicles has soared. While bringing convenience to people in traveling, vehicles also have some negative impact on human society. A rapid increase in a quantity of vehicles causes a series of problems such as urban traffic congestion, frequent traffic accidents, and worse environment quality. In consideration of personal safety, traffic efficiency, environmental protection, economic effects, and the like, a comprehensive intelligent transportation system (ITS) is needed. Currently, the ITS has naturally become a global concern.

At present, a vehicle can obtain road condition information or receive service information in time in a V2V, V2I, V2P, or V2N communication mode, and these communication modes may be collectively referred to as V2X communication.

FIG. 1 is a schematic diagram of a V2X system. The schematic diagram includes V2V communication, V2P communication, and V2I/N communication. As shown in FIG. 1, vehicles may communicate with each other in a V2V mode. A vehicle may broadcast information about the vehicle such as a driving speed, a driving direction, a specific location, and abrupt deceleration to surrounding vehicles, so that drivers of the surrounding vehicles can obtain the information to better learn of traffic conditions beyond their lines of sight, to predict a danger and further avoid the danger. Communication between the vehicle and roadside infrastructure is performed through V2I. The roadside infrastructure may provide access of various types of service information and data networks for the vehicle. Functions such as non-parking toll and in-car entertainment greatly improve traffic intelligence. The roadside infrastructure such as a road side unit (RSU) includes two types. One type is an RSU in a terminal device type. Because the RSU is distributed on the roadside, the RSU in the terminal device type is in a non-mobile state, and mobility does not need to be considered. The other type is an RSU in a network device type. The RSU in the network device type may provide timing synchronization and resource scheduling for a vehicle communicating with the network device. Vehicle-to-human (for example, vehicle-to-pedestrian, vehicle-to-cyclist, vehicle-to-driver, or vehicle-to-passenger) communication is performed through V2P. Vehicle-to-network communication is performed through V2N. V2N and V2I may be collectively referred to as V2I/N.

It should be understood that FIG. 1 is an example of a schematic diagram of a structure of a V2X system. This constitutes no limitation on embodiments of this application. For example, there may be a plurality of vehicles, pedestrians, and infrastructures, which are not necessarily limited to the quantities shown in FIG. 1.

Figure 2:
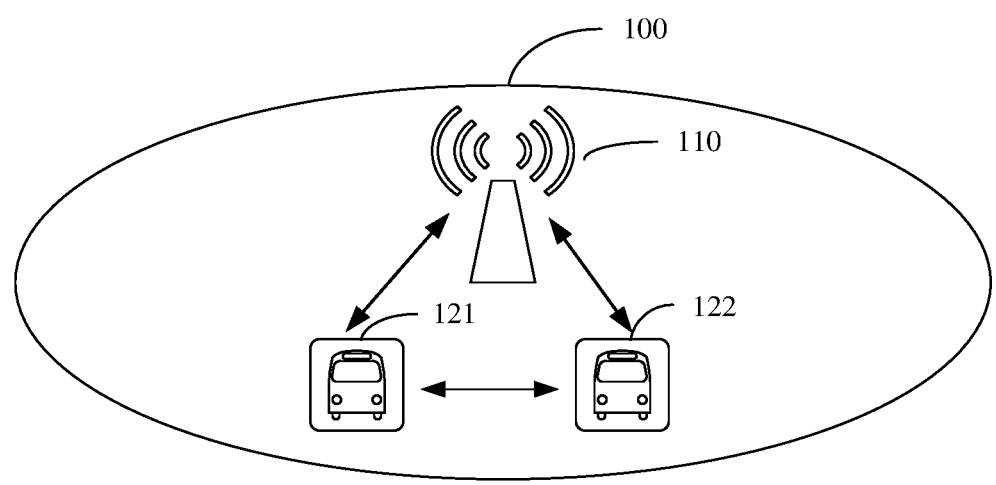
FIG. 2 is a schematic block diagram of a communication system to which an embodiment of this application is applicable.

FIG. 1 briefly describes the V2X system. With reference to FIG. 2, the following briefly describes a scenario to which an embodiment provided in this application is applicable.

In a currently emerging Internet of Vehicles technology, a PC5 interface may support communication between different devices, for example, between vehicles, or between a vehicle and another device. This application mainly relates to communication between two terminals. It should be understood that communication between a terminal device and a network device is also included. A method for communication between a network device and a terminal device is not limited in this application. For details, refer to stipulations in the current 3GPP TS 36.331 V15.7.0 technical specification.

FIG. 2 is a schematic block diagram of a communication system to which an embodiment of this application is applicable. As shown in FIG. 2, in a communication system 100, a terminal device 121 and a network device 110 may communicate with each other through an interface (for example, a Uu interface), a terminal device 122 and the network device 110 may communicate with each other through an interface (for example, a Uu interface), and the terminal device 121 and the terminal device 122 may communicate with each other through an interface (for example, a PC5 interface).

It should be understood that FIG. 2 is merely a schematic diagram, and does not constitute any limitation on the protection scope of this application. For example, the quantity of terminal devices shown in FIG. 2 is merely used as an example.

It should also be understood that communication between terminal devices involved in the V2X system is referred to as sidelink communication in this application. This does not constitute any limitation on this application. For example, the sidelink communication may alternatively be referred to as side link communication, direct link communication, secondary link communication, or the like. In addition, this embodiment is not necessarily limited to being used only in a V2X system, and is also applicable to another system in which synchronization communication is performed by using a synchronization signal and a master information block (MIB)-SL-V2X.

FIG. 2 describes a scenario to which this embodiment is applicable. For ease of understanding the technical solutions of this application, the following briefly describes several basic concepts in the technical solutions of this application.

It should be understood that the basic concepts described below are briefly described by using a basic concept stipulated in the current 3GPP TS 36.331 V15.7.0 technical specification as an example, but it is not limited that embodiments of this application can be applied only to a currently known system. Therefore, all standard names appearing when the current 3GPP TS 36.331 V15.7.0 technical specification is used as an example for description are function descriptions. A specific name is not limited, represents only a function, and may be correspondingly extended to another system such as an LTE, an NR, or a future communication system.

1. PC5 Interface

In a development process of a mobile communication system, a PC5 interface is introduced between devices, to better meet user demands and improve efficiency of information exchange between devices. Currently, the PC5 interface can be used in the V2X system. The terminal device may include a PC5 interface of a communication system such as an LTE standard or an NR standard system, so that the terminal device can perform communication through the PC5 interface.

2. Signal Synchronization

An example in which a terminal device #1 and a terminal device #2 communicate with each other through a PC5 interface is used for description. It should be understood that the terminal device #1 and the terminal device #2 communicate with each other through the PC5 interface on a premise that signal synchronization needs to be performed between the terminal devices.

A terminal device needs to send a sidelink synchronization signal (SLSS) (briefly referred to as a synchronization signal for ease of description), to implement subframe-level synchronization between terminal devices. The SLSS includes a primary sidelink synchronization signal (PSSS) and a secondary sidelink synchronization signal (SSSS). For terminal devices participating in V2X broadcast communication, the terminal device #1 sending a broadcast communication signal sends an SLSS, to implement subframe-level synchronization between the terminal device sending the broadcast signal and a terminal device receiving the broadcast signal. In addition, to enable the terminal device #2 to obtain configuration information of the terminal device #1, such as a bandwidth, time division duplex (TDD), a reserved bit, and incoverage information indicating whether the terminal device #1 is in a coverage area of an access network device, the terminal device #1 needs to send message over a physical sidelink broadcast channel (PSBCH). The PSBCH carries MIB-SL-V2X information, and the MIB-SL-V2X information (which, for ease of description, may be referred to as a master information block for short) includes the foregoing bandwidth information, TDD information, reserved information, and incoverage information.

Each terminal device sending an SLSS corresponds to one sidelink synchronization source identifier (SLSS ID), which is denoted as $N_{ID}^{SL} \cdot N_{ID}^{SL} = N_{ID}^{(1)} + 168 \ast N_{ID}^{(2)}$, where $N_{ID}^{(1)}$ is an intra-group identifier of a sidelink synchronization source group, and $N_{ID}^{(2)}$ is an identifier of the sidelink synchronization source group. An SLSS occupies four single-carrier frequency division multiple access (SC-FDMA) symbols in a subframe. A PSSS occupies two adjacent SC-FDMA symbols, and an SSSS occupies two adjacent SC-FDMA symbols. Except for the last SC-FDMA symbol that is of the subframe and that is used for a guard period, other symbols are used for PSBCH transmission. Specifically, the PSSS and the SSSS are used to determine the SLSS ID, where the PSSS is used to determine $N_{ID}^{(2)}$ and the SSSS is used to determine $N_{ID}^{(1)}$.

It should be understood that, in this embodiment, that an SLSS ID is referred to as a sidelink synchronization source identifier is merely an example. This does not constitute any limitation on the protection scope of this application. For example, the SLSS ID may also be referred to as a synchronization signal identifier.

A terminal device participating in V2X broadcast communication measures a sidelink-reference signal receiving power (S-RSRP) by using a demodulation reference signal of a PSBCH, and needs to select a synchronization source based on strength of a synchronization signal from the synchronization source. The terminal device #2 determines a demodulation reference signal of a PSBCH of the synchronization signal based on the S-RSRP, and measures strength of the synchronization signal.

3. Ad Hoc Network

An ad hoc network in embodiments of this application means that after a terminal device without selected synchronization reference broadcasts synchronization information, another terminal device uses the terminal device without selected synchronization reference as a synchronization source and synchronizes with the terminal device without selected synchronization reference. In this case, the terminal device without selected synchronization reference and the another terminal device that synchronizes with the terminal device without selected synchronization reference form an ad hoc network. In this application, that two terminal devices form an ad hoc network may also be referred to as that the two terminal devices are synchronized.

4. A Terminal Device without Selected Synchronization Reference

A terminal device without selected synchronization reference (no selected SynRef UE) in embodiments of this application may be referred to as a self-synchronizing terminal device. A terminal device without selected synchronization reference means that the terminal device does not find any synchronization source, and broadcasts synchronization information. The synchronization information includes a synchronization signal and a master information block.

For example, both the terminal device #1 and the terminal device #2 are terminal devices without selected synchronization reference. If the terminal device #1 is not covered by the Global Navigation Satellite System (GNSS) or a cell, and does not find any synchronization signal of another terminal device, the terminal device #1 performs self-synchronization and sends a synchronization signal. Similarly, if the terminal device #2 is not covered by the GNSS or a cell, and does not find any synchronization signal of another terminal device, the terminal device #2 performs self-synchronization and sends a synchronization signal.

When there is a distance between the terminal device #1 and the terminal device #2, the terminal device #1 and the terminal device #2 cannot find the synchronization signal of each other. When the terminal device #1 and the terminal device #2 are close to each other, the terminal device #1 and the terminal device #2 can detect the signal of each other. Due to a requirement of networking communication, a self-synchronizing terminal device has a lowest priority, and needs to be networked with another terminal device to perform communication. In this case, the terminal device #1 needs to synchronize with the terminal device #2, or the terminal device #2 needs to synchronize with the terminal device #1. That the terminal device #2 synchronizes with the terminal device #1 is used as an example. After detecting a synchronization signal of the terminal device #1, the terminal device #2 performs signal synchronization by using the terminal device #1 as a synchronization source. After synchronizing with the terminal device #1, the terminal device #2 discards the previously sent synchronization signal, and sends a new synchronization signal, or does not send a synchronization signal.

5. Signal Synchronization of a Terminal Device without Selected Synchronization Reference In a possible case, after the terminal device #1 and the terminal device #2 without selected synchronization reference complete synchronization (for example, the terminal device #2 synchronizes with the terminal device #1), the terminal device #1 and the terminal device #2 belong to a same ad hoc network. When received energy of a synchronization signal sent by the terminal device #1 and received by the terminal device #2 is less than a threshold (syncTxThreshOoC), the terminal device #2 broadcasts the synchronization signal of the terminal device #1. When received energy of a synchronization signal sent by the terminal device #1 and received by the terminal device #2 is greater than the syncTxThreshOoC, the terminal device #2 does not broadcast the synchronization signal of the terminal device #1.

After the terminal device #2 synchronizes with the terminal device #1, the terminal device #1 is still in a self-synchronizing state, and may receive a synchronization signal broadcast by the terminal device #2. Because a priority of the self-synchronizing state is low, the terminal device #1 may perform signal synchronization and synchronize with the terminal device #2 after detecting the synchronization signal broadcast by the terminal device #2. The terminal device #2 broadcasts the synchronization signal of the terminal device #1. If the terminal device #1 detects that received energy of the synchronization signal broadcast by the terminal device #2 is lower than syncTxThreshOoC, the terminal device #1 and the terminal device #2 can still normally communicate with each other, and only a synchronization source is switched (the synchronization source is switched from the terminal device #1 to the terminal device #2).

However, if received energy of the synchronization signal broadcast by the terminal device #2 and received by the terminal device #1 is higher than syncTxThreshOoC, the terminal device #1 no longer sends the synchronization signal, and the terminal device #2 finds that the synchronization source of terminal device #1 does not exist. Consequently, communication between the terminal device #1 and the terminal device #2 is interrupted.

In another possible case, the terminal device #1 and the terminal device #2 without selected synchronization reference simultaneously detect a synchronization signal of each other when they gradually approach each other. In this case, the terminal device #1 and the terminal device #2 simultaneously trigger synchronization with each other, and stop sending the synchronization signal. The terminal device #1 synchronizes with the terminal device #2, and the terminal device #2 synchronizes with the terminal device #1. Then, the terminal device #1 finds that the synchronization signal of the terminal device #2 no longer exists, and the terminal device #2 finds that the synchronization signal of the terminal device #1 no longer exists. The terminal device #1 and the terminal device #2 again do not have a synchronization source, and continuously synchronize with each other when they are in the self-synchronizing state. Consequently, communication cannot be implemented.

With reference to FIG. 1, the foregoing briefly describes a scenario to which the method for signal synchronization provided in embodiments of this application can be applied, and describes basic concepts that may be used in embodiments of this application. With reference to the accompanying drawings, the following describes in detail the method for signal synchronization provided in embodiments of this application.

It should be understood that the method for signal synchronization provided in embodiments of this application may be applied to a V2X system, for example, the communication system shown in FIG. 2. The communication system may include at least two terminal devices. The terminal devices can communicate with each other through the PC5 interface.

It should be further understood that a specific structure of an entity for executing the method provided in embodiments of this application is not specially limited in the following embodiments, provided that a program that records code for the method provided in embodiments of this application can be run to perform communication according to the method provided in embodiments of this application. For example, the method provided in embodiments of this application may be performed by a terminal device, or a functional module of the terminal device that can invoke and execute the program.

The following generally describes in detail the method for signal synchronization provided in embodiments of this application by using interaction between terminal devices as an example.

Figure 3:
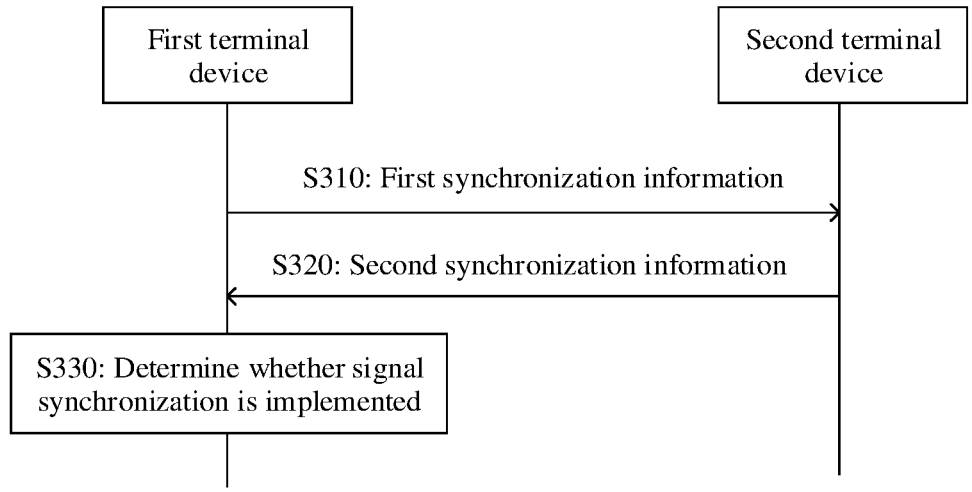
FIG. 3 is a schematic flowchart of a method for signal synchronization according to an embodiment of this application.

FIG. 3 is a schematic flowchart of a method for signal synchronization according to an embodiment of this application. Entities for executing the method in the flowchart include a first terminal device and a second terminal device.

The method for signal synchronization includes at least a part of the following steps.

S310: The first terminal device broadcasts first synchronization information.

In this embodiment, the first terminal device does not have any selected synchronization reference, or is referred to as a self-synchronizing terminal device. To be specific, the first terminal device has no any synchronization source. For example, the first terminal device is not covered by the GNSS, is not covered by a cell, and does not find any synchronization information of another terminal device.

The first synchronization information includes a first synchronization signal and a first master information block. The first synchronization signal includes a first PSSS and a first SSSS, and the first master information block may be referred to as a first MIB-SL-V2X. The first master information block includes bandwidth information, TDD information, reserved bit information (for example, reserved information), and coverage area information (for example, incoverage information) of the first terminal device.

It should be understood that the first synchronization information broadcast by the first terminal device is used to complete signal synchronization with another terminal device, to form an ad hoc network. Specific information included in the first synchronization information and functions implemented by different information in a signal synchronization procedure are not limited in embodiments of this application. For details, refer to stipulations in the current 3GPP TS 36.331 V15.7.0 technical specification.

In a possible implementation, the first terminal device is a terminal device that is in a self-synchronizing state and that does not form an ad hoc network with another terminal device.

In another possible implementation, the first terminal device is a terminal device that forms an ad hoc network with another terminal device but is still in a self-synchronizing state.

For example, another terminal device synchronizes with the first terminal device by using the first terminal device as a synchronization source, but the first terminal device cannot learn that the another terminal device has synchronized with the first terminal device, and considers that the first terminal device is still a terminal device in a self-synchronizing state.

S320: The first terminal device receives second synchronization information sent by the second terminal device.

In certain embodiments, the second synchronization information includes a second synchronization signal and a second master information block. The second synchronization signal includes a second PSSS and a second SSSS, and the second master information block is a second MIB-SL-V2X. The second master information block includes bandwidth information, TDD information, reserved bit information (for example, reserved information), and coverage area information (for example, incoverage information) of the second terminal device.

In a possible implementation, the second terminal device is a terminal device that has not implemented signal synchronization with the first terminal device. In other words, after detecting the second synchronization information sent by the second terminal device, the first terminal device in the self-synchronizing state completes signal synchronization with the second terminal device.

In another possible implementation, the second terminal device is a terminal device that has implemented signal synchronization with the first terminal device. In other words, in this implementation, after detecting the second synchronization information sent by the second terminal device, the first terminal device in the self-synchronizing state does not need to complete signal synchronization with the second terminal device.

In conclusion, different from the foregoing signal synchronization of the terminal device without selected synchronization reference, in the method for signal synchronization provided in this embodiment, after the first terminal device detects the second synchronization information sent by the second terminal device, even if the first terminal device is in the self-synchronizing state and has a low priority, the first terminal device does not rashly synchronize with the second terminal device by using the second terminal device as a synchronization source. In this application, the first terminal device determines, based on the first synchronization information and the second synchronization information, whether the first terminal device and the second terminal device have completed signal synchronization and belong to a same ad hoc network.

When the first synchronization information is the same as the second synchronization information, it indicates that the first terminal device and the second terminal device have implemented signal synchronization, and the first terminal device does not need to synchronize with the second terminal device by using the second terminal device as a synchronization source.

Alternatively, when the first synchronization information is different from the second synchronization information, it indicates that the first terminal device and the second terminal device have not implemented signal synchronization, and the first terminal device may synchronize with the second terminal device by using the second terminal device as a synchronization source.

Optionally, energy of the first synchronization information broadcast by the first terminal device and received by the second terminal device is less than a preset threshold (for example, a threshold syncTxThreshOoC specified in the current 3GPP TS 36.331 V15.7.0 technical specification), and received energy of the second synchronization information received by the first terminal device is greater than or equal to the preset threshold. The preset threshold is a threshold known to the first terminal device and the second terminal device.

It should be understood that, according to the foregoing method for signal synchronization of the terminal device without selected synchronization reference, even if the second terminal device has synchronized with the first terminal device, when the energy of the first synchronization information broadcast by the first terminal device and received by the second terminal device is less than the preset threshold, the second terminal device still sends the second synchronization information. In addition, when the received energy of the second synchronization information is greater than or equal to the preset threshold, the first terminal device synchronizes with the second terminal device by using the second terminal device as a synchronization source, and the first terminal device no longer sends the first synchronization information. Consequently, the second terminal device finds that the synchronization source first terminal device does not exist, and communication between the first terminal device and the second terminal device is interrupted. However, according to the method for signal synchronization provided in this application, even if received energy of the second synchronization information received by the first terminal device is greater than or equal to the preset threshold, the first terminal device does not directly initiate synchronization, but first determines whether it has synchronized with the second terminal device.

The method procedure shown in FIG. 3 further includes S330: The first terminal device determines whether the first terminal device and the second terminal device have implemented signal synchronization and belong to a same ad hoc network.

The first terminal device can determine, based on the second synchronization information, a working frequency of the second terminal device, an identifier of the second synchronization signal, and the bandwidth information, the TDD information, the reserved bit information, and the coverage area information that are of the second terminal device and that are included in the second master information block. The identifier of the second synchronization signal may be determined based on the second PSSS and the second SSSS. The identifier of the second synchronization signal may be learned from the foregoing description: $N_{ID}^{SL}=N_{ID}^{(1)}+168*N_{ID}^{(2)}$ where $N_{ID}^{(2)}$ is obtained by detecting the second PSSS and $N_{ID}^{(1)}$ is obtained by detecting the second SSSS.

After obtaining the working frequency of the second terminal device (the working frequency of the first terminal device is equal to that of the second terminal device), the identifier of the second synchronization signal, and the bandwidth information, the TDD information, the reserved bit information, and the coverage area information that are of the second terminal device and that are included in the second master information block, the first terminal device may determine whether the first terminal device and the second terminal device belong to the same ad hoc network.

When the first synchronization information is the same as the second synchronization information, the first terminal device remains as a terminal device without selected synchronization reference, that is, the first terminal device learns that the first terminal device and the second terminal device have implemented signal synchronization, and the first terminal device still broadcasts the first synchronization information of the first terminal device.

When the first synchronization information is different from the second synchronization information, the first terminal device determines that the first terminal device and the second terminal device do not complete signal synchronization at a current moment. In this case, the first terminal device may synchronize with the second terminal device by using the second terminal device as a synchronization source.

However, it is not limited in this application that after receiving the second synchronization information, the first terminal device determines that the first terminal device and the second terminal device do not complete signal synchronization at the current moment, and immediately synchronizes with the second terminal device by using the second terminal device as a synchronization source. The first terminal device may wait for a first random duration and then determine whether the first terminal device and the second terminal device have implemented signal synchronization. If the first terminal device determines that the first terminal device and the second terminal device still do not complete signal synchronization after waiting for the first random duration, the first terminal device synchronizes with the second terminal device by using the second terminal device as a synchronization source.

It should be understood that, after the first random duration, synchronization information sent by the second terminal device and received by the first terminal device may be or may no longer be the foregoing second synchronization information, and is referred to as third synchronization information in this application. In certain embodiments, after waiting for the first random duration, the first terminal device may not be able to immediately receive the third synchronization information, that is, the third synchronization information sent by the second terminal device and received by the first terminal device is synchronization information that is sent by the second terminal device at a moment after the first terminal device waits for the first random duration. For example, if the second terminal device sends the synchronization information in a cycle of 160 ms, the third synchronization information may be synchronization information sent by the second terminal device and received by the first terminal device within 0 ms to 160 ms after the first terminal device waits for the first random duration.

In certain embodiments, the third synchronization information includes a third synchronization signal and a third master information block. The third synchronization signal includes a third PSSS and a third SSSS, and the third master information block is a third MIB-SL-V2X. The third master information block includes bandwidth information, TDD information, reserved bit information (for example, reserved information), and coverage area information (for example, incoverage information) of the second terminal device. A parameter included in the third master information block is a parameter related to the second terminal device that is included in the third synchronization information received by the first terminal device after the first terminal device receives the second synchronization information and waits for the random duration. The parameter included in the third master information block may be the same as the parameter included in the second master information block (for example, the first terminal device still receives the second synchronization information after waiting for the first random duration).

When the first synchronization information is the same as the third synchronization information, the first terminal device remains as the terminal device without selected synchronization reference. After receiving the second synchronization information and waiting for the first random duration, the first terminal device learns that the first terminal device and the second terminal device have implemented signal synchronization, and the first terminal device still broadcasts the first synchronization information of the first terminal device. Further, even if signal quality of the third synchronization information received by the first terminal device is greater than the preset threshold in this case, the first terminal device continues to broadcast the first synchronization information.

When the first synchronization information is different from the third synchronization information, the first terminal device determines that the first terminal device and the second terminal device do not complete signal synchronization at the current moment. In this case, the first terminal device may synchronize with the second terminal device by using the second terminal device as a synchronization source.

In a possible implementation, the first synchronization information is different from the second synchronization information when at least one of the following listed conditions is not met:

(1) An identifier of the first synchronization signal is the same as the identifier of the second synchronization signal.

(2) A parameter included in the first master information block is the same as the parameter included in the second master information block.

When both the foregoing conditions (1) and (2) are met, the first terminal device determines that the second terminal device and the first terminal device have completed signal synchronization, and does not need to perform signal synchronization again. To be specific, the second terminal device has synchronized with the first terminal device by using the first terminal device as a synchronization source, and the first terminal device does not need to initiate signal synchronization by using the second terminal device as a synchronization source after detecting the second synchronization information.

When at least one of the foregoing conditions (1) and (2) is not met, the first terminal device determines that the second terminal device and the first terminal device do not complete signal synchronization, and the first terminal device initiates signal synchronization by using the second terminal device as a synchronization source.

For example, the first terminal device updates the identifier of the first synchronization signal so that the identifier of the first synchronization signal is the same as the identifier of the second synchronization signal, and/or the first terminal device updates the parameter included in the first master information block so that the parameter included in the first master information block is the same as the parameter included in the second master information block.

How the first terminal device completes signal synchronization based on the detected synchronization information sent by the second terminal device is not limited in this application. For details, refer to a stipulation on signal synchronization in the current 3GPP TS 36.331 V15.7.0 technical specification, or refer to a stipulation in a future protocol.

For example, when the foregoing condition (1) is not met, the first terminal device determines that the second terminal device and the first terminal device do not complete signal synchronization, and the first terminal device initiates signal synchronization by using the second terminal device as a synchronization source.

In certain embodiments, the first terminal device learns of the identifier of the second synchronization signal based on the received second synchronization information. To make the identifier of the first synchronization signal the same as the identifier of the second synchronization signal, the first terminal device may update the first PSSS and the first SSSS in the first synchronization signal, so that the first PSSS is the same as the second PSSS, and the first SSSS is the same as the second SSSS. In this case, the identifier of the first synchronization signal determined based on the updated first PSSS and the first SSSS is the same as the identifier of the second synchronization signal determined based on the second PSSS and the second SSSS.

For example, when the foregoing condition (2) is not met, the first terminal device determines that the second terminal device and the first terminal device do not complete signal synchronization, and the first terminal device initiates signal synchronization by using the second terminal device as a synchronization source.

In certain embodiments, the first terminal device learns of the parameter included in the second master information block based on the received second synchronization information. To make the parameter included in the first master information block the same as the parameter included in the second master information block, the first terminal device may update a parameter value included in the first master information block, so that the updated parameter included in the first master information block is the same as the parameter included in the second master information block.

For example, the second master information block includes the bandwidth information of the second terminal device, and the first master information block includes the bandwidth information of the first terminal device. If the bandwidth information of the first terminal device is different from the bandwidth information of the second terminal device, the first terminal device updates the bandwidth information of the first terminal device included in the first master information block to the bandwidth information of the second terminal device, so that the parameter included in the first master information block is the same as the parameter included in the second master information block.

For another example, the second master information block includes the bandwidth information of the second terminal device, the TDD information of the second terminal device, the reserved bit information of the second terminal device, and the coverage area information of the second terminal device. The first master information block includes the bandwidth information of the first terminal device, the TDD information of the first terminal device, the reserved bit information of the first terminal device, and the coverage area information of the first terminal device. If the bandwidth information of the first terminal device is different from the bandwidth information of the second terminal device, the TDD information of the first terminal device is different from the TDD information of the second terminal device, the reserved bit information of the first terminal device is different from the reserved bit information of the second terminal device, and the coverage area information of the first terminal device is different from the coverage area information of the second terminal device, the first terminal device updates the bandwidth information of the first terminal device included in the first master information block to the bandwidth information of the second terminal device, updates the TDD information of the first terminal device included in the first master information block to the TDD information of the second terminal device, updates reserved bit information of the first terminal device included in the first master information block to the reserved bit information of the second terminal device, and updates the coverage area information of the first terminal device included in the first master information block to the coverage area information of the second terminal device, so that the parameter included in the first master information block is the same as the parameter included in the second master information block.

For example, when neither the foregoing condition (1) nor (2) is met, the first terminal device determines that the second terminal device and the first terminal device do not complete signal synchronization, and the first terminal device may synchronize with the second terminal device by using the second terminal device as a synchronization source.

Optionally, the first terminal device learns of the identifier of the second synchronization signal and the parameter included in the second master information block based on the received second synchronization information. To make the identifier of the first synchronization signal the same as the identifier of the second synchronization signal, the first terminal device updates the first PSSS and the first SSSS in the first synchronization signal, so that the first PSSS is the same as the second PSSS, and the first SSSS is the same as the second SSSS. To make the parameter included in the first master information block the same as the parameter included in the second master information block, the first terminal device updates the parameter included in the first master information block, so that the parameter included in the first master information block is the same as the parameter included in the second master information block.

Similarly, in another possible implementation, the first synchronization information is different from the third synchronization information when at least one of the following listed conditions is not met:

(3) The identifier of the first synchronization signal is the same as an identifier of the third synchronization signal.

(4) The parameter included in the first master information block is the same as a parameter included in the third master information block.

When at least one of the foregoing conditions (3) and (4) is not met, the first terminal device determines that the second terminal device and the first terminal device have not implemented signal synchronization after receiving the second synchronization information and waiting for the first random duration, and the first terminal device initiates signal synchronization by using the second terminal device as a synchronization source. Specifically, the synchronization procedure is similar to the case in which at least one of (1) and (2) is not met.

Further, after the first terminal device performs signal synchronization by using the second terminal device as a synchronization source, the first terminal device may serve as a relay device of the second terminal device, and send the synchronization information of the second terminal device to another device.

For example, after receiving the second synchronization information, and performing signal synchronization by using the second terminal device as a synchronization source, the first terminal device broadcasts the second synchronization information when signal quality of the second synchronization information received by the first terminal device from the second terminal device is less than or equal to the preset threshold.

For another example, after receiving the second synchronization information and waiting for a first random duration, the first terminal device receives the third synchronization information, and performs signal synchronization by using the second terminal device as a synchronization source. After that, the first terminal device broadcasts the third synchronization information when signal quality of the third synchronization information received by the first terminal device from the second terminal device is less than or equal to the preset threshold.

In a possible case, the second terminal device is also in a self-synchronizing state, and broadcasts the second synchronization information. In addition, a moment at which the first terminal device receives the second synchronization information is the same as or approximately the same as a moment at which the second terminal device receives the first synchronization information (this may result in simultaneously initiating synchronization by using the other party as a switching source).

In this case, in this embodiment, the first terminal device may synchronize with the second terminal device based on the received synchronization information sent by the second terminal device, or the second terminal device may synchronize with the first terminal device based on the received synchronization information sent by the first terminal device. To avoid a defect of possible communication failure due to continuous synchronization that is caused because the first terminal device and the second terminal device simultaneously trigger synchronization with each other in the foregoing signal synchronization procedure of the terminal device without selected synchronization reference, it is limited in this application that the first terminal device and the second terminal device initiate synchronization with each other at different moments, that is, signal synchronization is initiated asynchronously.

In certain embodiments, after receiving the second synchronization information sent by the second terminal device, the first terminal device waits for a first random duration before initiating signal synchronization, and synchronizes with the second terminal device based on the third synchronization information sent by the second terminal device. After receiving the first synchronization information sent by the first terminal device, the second terminal device waits for a second random duration before initiating signal synchronization, and synchronizes with the first terminal device based on fifth synchronization information sent by the first terminal device.

It should be understood that specific lengths of the first random duration and the second random duration are not limited in embodiments of this application, but the first random duration is very probably different from the second random duration (for example, the first random duration of the first terminal device is less probably equal to the second random duration of the second terminal device). Specific lengths of the first random duration and the second random duration may be predefined in a protocol (for example, the 3GPP TS 36.331 V15.7.0 technical specification), randomly set by a terminal device, or set by another device. In this embodiment, how the first terminal device learns of the first random duration and how the second terminal device learns of the second random duration are not limited.

It may be understood that, when the first random duration is longer than the second random duration, the first terminal device first performs signal synchronization, and synchronizes with the second terminal device by using the second terminal device as a synchronization source. After signal synchronization is completed, the first terminal device and the second terminal device belong to a same ad hoc network, and the first terminal device broadcasts synchronization information of the second terminal device or does not broadcast information. After the second terminal device waits for the second random duration, because the first terminal device has synchronized with the second terminal device, the second terminal device may detect the synchronization information from the second terminal device which is broadcast by the first terminal device, or the second terminal device does not detect the synchronization information from the second terminal device that is broadcast by the first terminal device. If the second terminal device detects the synchronization information sent by the second terminal device, the second terminal device determines that the first terminal device and the second terminal device have completed signal synchronization, and does not initiate signal synchronization again. If the second terminal device does not detect the synchronization information broadcast by the first terminal device, the second terminal device does not initiate signal synchronization. This avoids as much as possible a defect of communication failure due to continuous synchronization that is caused because the first terminal device and the second terminal device simultaneously trigger synchronization with each other.

To better understand the method for signal synchronization shown in FIG. 3, the following provides descriptions with reference to specific embodiments.

Figure 4:
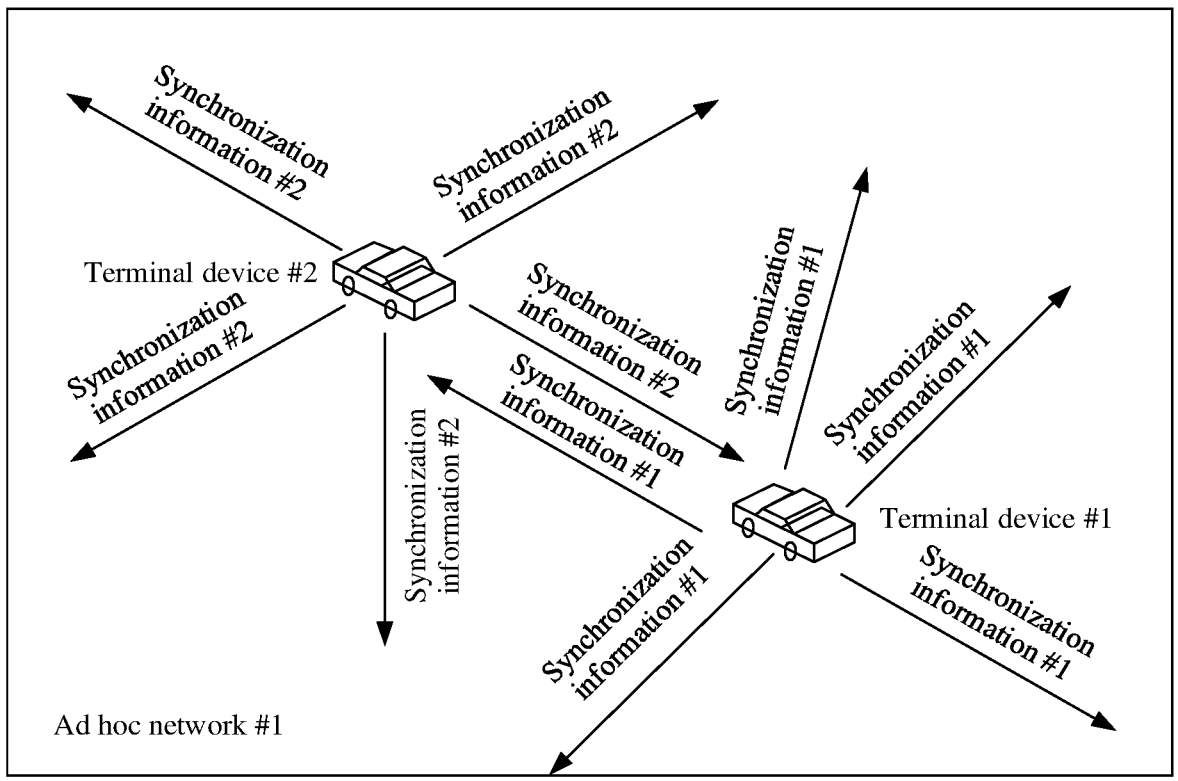
FIG. 4 is a schematic diagram of a method for signal synchronization according to an embodiment of this application.

FIG. 4 is a schematic diagram of a method for signal synchronization according to an embodiment of this application. A terminal device #1 and a terminal device #2 shown in FIG. 4 belong to an ad hoc network #1.

The terminal device #1 broadcasts synchronization information #1, and the terminal device #2 broadcasts synchronization information #2. An example in which the terminal device #1 is the foregoing first terminal device and the terminal device #2 is the foregoing second terminal device is used to describe how the terminal device #1 and the terminal device #2 implement signal synchronization.

In a possible implementation, after receiving the synchronization information #2, the terminal device #1 determines, based on the synchronization information #1 broadcast by the terminal device #1 and the received synchronization information #2, that the terminal device #1 and the terminal device #2 have implemented signal synchronization. In this case, even if the terminal device #1 receives the synchronization information, the terminal device #1 does not initiate signal synchronization by using the terminal device #2 as a synchronization source.

Figure 5A:
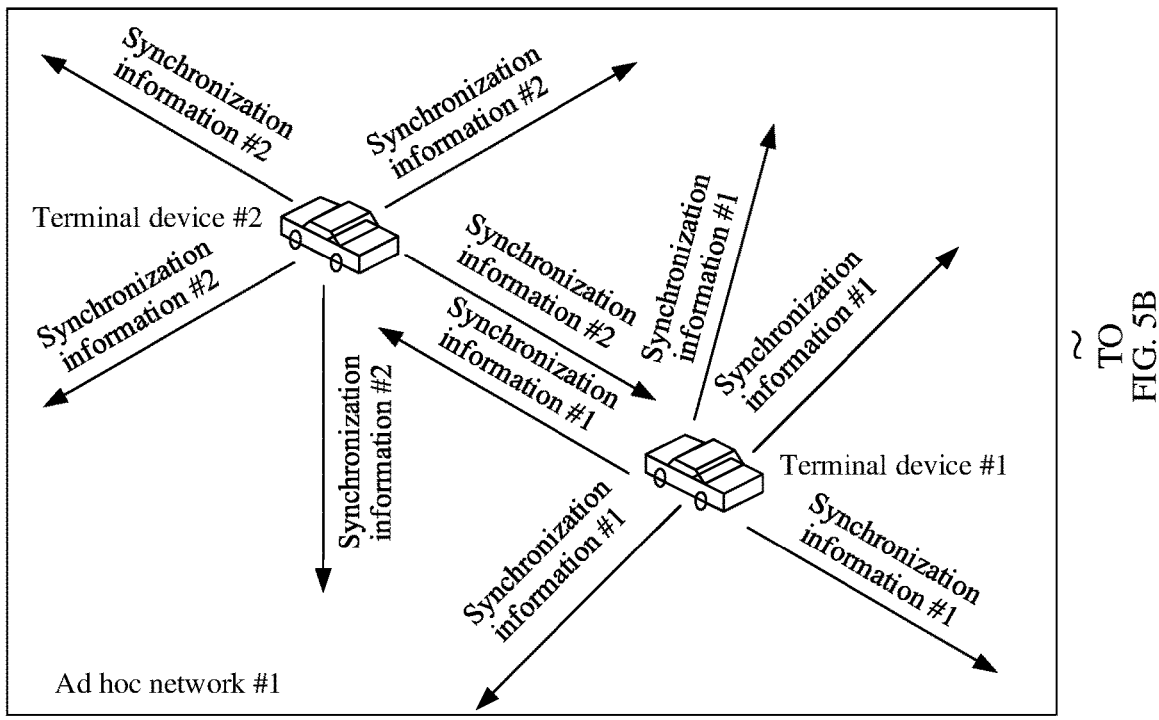
FIG. 5A and FIG. 5B are a schematic diagram of another method for signal synchronization according to an embodiment of this application.
Figure 5B:
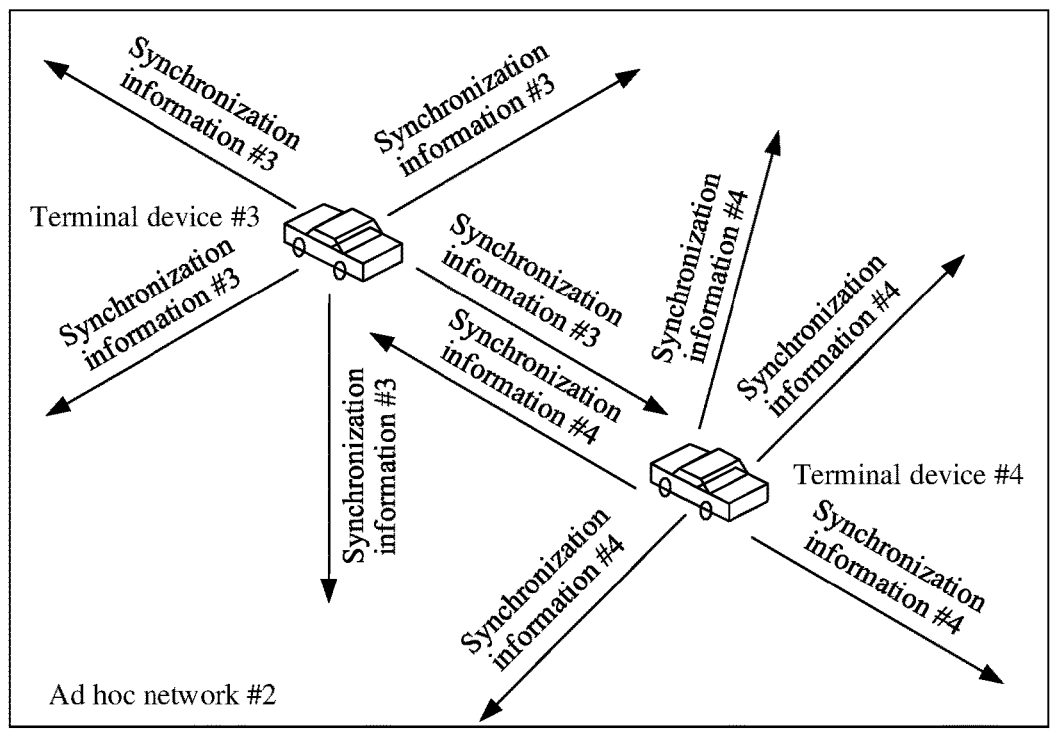

FIG. 5A and FIG. 5B each is a schematic diagram of another method for signal synchronization according to an embodiment of this application. A terminal device #1 and a terminal device #2 shown in FIG. 5A and FIG. 5B belong to an ad hoc network #1, and a terminal device #3 and a terminal device #4 belong to an ad hoc network #2.

The terminal device #1 broadcasts synchronization information #1, the terminal device #2 broadcasts synchronization information #2, the terminal device #3 broadcasts synchronization information #3, and the terminal device #4 broadcasts synchronization information #4. An example in which the terminal device #1 is the foregoing first terminal device and the terminal device #3 is the foregoing second terminal device is used to describe how the terminal device #1 and the terminal device #3 implement signal synchronization.

Because the terminal device #1 and the terminal device #3 belong to different ad hoc networks, when the terminal device #1 is far away from the terminal device #3, the terminal device #1 and the terminal device #3 cannot detect a synchronization signal of each other. The following situations may occur when they gradually approach each other.

If a moment at which the terminal device #1 detects the synchronization information #3 is the same as or close to a moment at which the terminal device #3 detects the synchronization information #1, the terminal device #1 uses the terminal device #3 as a synchronization source, and the terminal device #3 uses the terminal device #1 as a synchronization source. To avoid as much as possible communication interruption caused because the terminal device #1 and the terminal device #3 simultaneously or basically simultaneously initiate signal synchronization, according to the method for signal synchronization provided in this application, the terminal device #1 and the terminal device #3 asynchronously initiate signal synchronization. Specifically, after detecting the synchronization information #3, the terminal device #1 waits for a first random duration, and then initiates signal synchronization. After detecting the synchronization information #1, the terminal device #3 waits for a second random duration, and then initiates signal synchronization. The first random duration is different from the second random duration (for example, the first random duration is 10 ms, and the second random duration is 15 ms).

In a possible implementation, the first random duration is shorter than the second random duration. Because start moments are the same or close (a start moment of waiting is a moment at which synchronization information of the other party is received), when the first random duration is shorter than the second random duration, it indicates that the terminal device #1 initiates signal synchronization before the terminal device #3. Specifically, within the first random duration after a moment at which the terminal device #1 receives the synchronization information #3 for the first time, the terminal device #1 initiates signal synchronization by using the terminal device #3 as a synchronization source based on the received synchronization information #3 sent by the terminal device #3, and synchronizes with the terminal device #3.

It should be understood that synchronization information #3' detected by the terminal device #1 within the first random duration after the terminal device #1 receives the synchronization information #3 may be different from the synchronization information #3 (for example, the synchronization information broadcast by the terminal device #3 changes within the first random duration), or may be the same as the synchronization information #3. Specific content of synchronization information detected when the terminal device #1 initiates signal synchronization is not limited in embodiments of this application. However, it is limited the terminal device #1 initiates signal synchronization after the terminal device #1 receives the synchronization information #3 for the first time and waits for a random duration. After synchronizing to the terminal device #3, the terminal device #1 broadcasts the synchronization information of the terminal device #3. In this case, after receiving the synchronization information #1 for the first time and waiting for a second random duration, the terminal device #3 receives the synchronization information #3' sent by the terminal device #1, and learns that the terminal device #1 and the terminal device #3 have implemented signal synchronization, and the terminal device #3 does not need to initiate signal synchronization again.

In the case shown in FIG. 5A and FIG. 5B, as described above, if the first random duration is shorter than the second random duration, after the terminal device #1 synchronizes with the terminal device #3, the terminal device #1, the terminal device #3, and the terminal device #4 in FIG. 5A and FIG. 5B belong to the ad hoc network #2. Further, the terminal device #2 can synchronize with the terminal device #1, the terminal device #3, or the terminal device #4 based on detected synchronization information broadcast by the terminal device #1, the terminal device #3, or the terminal device #4, so that the terminal device #1, the terminal device #2, the terminal device #3, and the terminal device #4 belong to a same ad hoc network.

In another possible implementation, the first random duration is longer than the second random duration. In this implementation, the terminal device #3 first synchronizes with the terminal device #1. A specific signal synchronization procedure is similar to the foregoing implementation.

Optionally, the first terminal device may be a first vehicle or a chip or a circuit disposed in the first vehicle, and the second terminal device may be a second vehicle or a chip or a circuit disposed in the second vehicle. In other words, the method for signal synchronization provided in this application may be applied to a V2V scenario.

Sequence numbers of the foregoing processes do not mean execution sequences in the foregoing method embodiments. The execution sequences of the processes should be determined based on functions and internal logic of the processes, and should not be construed as any limitation on the implementation processes of embodiments of this application. In addition, it is possible that not all operations in the foregoing method embodiments need to be performed.

It should be understood that the terminal device in the foregoing method embodiments may perform a part or all of the steps in the embodiments. These steps or operations are merely examples. Embodiments of this application may further include performing other operations or variations of various operations.

It should be further understood that, in embodiments of this application, unless otherwise specified or in case of a logical conflict, terms and/or descriptions in different embodiments may be consistent and may be mutually referenced. Technical features in different embodiments may be combined based on an internal logical relationship of the technical features to form a new embodiment.

The foregoing describes in detail the methods for signal synchronization provided in embodiments of this application with reference to FIG. 3 to FIG. 5A and FIG. 5B. The following describes in detail apparatuses for signal synchronization provided in embodiments of this application with reference to FIG. 6 and FIG. 7.

Figure 6:
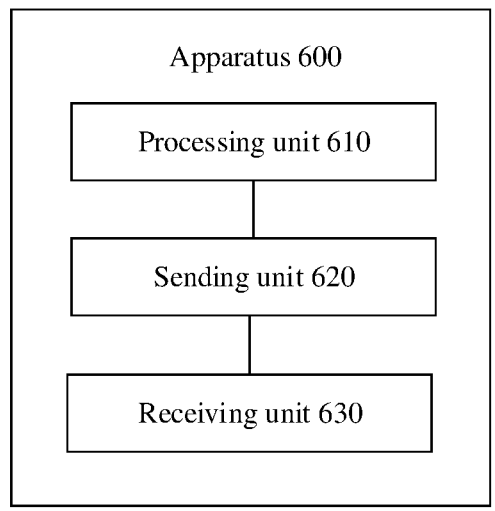
FIG. 6 is a schematic diagram of an apparatus for signal synchronization according to this application.

FIG. 6 is a schematic diagram of an apparatus 600 for signal synchronization according to an embodiment of this application. As shown in FIG. 6, the apparatus 600 includes a processing unit 610, a sending unit 620, and a receiving unit 630.

The sending unit 620 is configured to broadcast first synchronization information, where the first synchronization information includes a first synchronization signal and a first master information block. The apparatus for signal synchronization includes a first terminal device without selected synchronization reference or a chip or a circuit disposed in the first terminal device.

The receiving unit 630 is configured to receive second synchronization information from a second terminal device, where the second synchronization information includes a second synchronization signal and a second master information block.

The processing unit 610 is configured to determine, based on the first synchronization information and the second synchronization information, whether the first terminal device and the second terminal device have implemented signal synchronization.

In this embodiment, the processing unit 610 is configured to enable the first terminal device to remain as the terminal device without selected synchronization reference when the first synchronization information is the same as the second synchronization information; and the processing unit 610 is configured to enable the first terminal device to perform signal synchronization by using the second terminal device as a synchronization source when the first synchronization information is different from the second synchronization information; or the processing unit 610 is configured to enable the receiving unit 630 to receive third synchronization information from the second terminal device after the receiving unit 630 receives the second synchronization information and waits for a random duration when the first synchronization information is different from the second synchronization information, where the third synchronization information includes a third synchronization signal and a third master information block.

The processing unit 610 is configured to enable the first terminal device to remain as the terminal device without selected synchronization reference when the first synchronization information is the same as the third synchronization information; and the processing unit 610 is configured to enable the first terminal device to perform signal synchronization by using the second terminal device as a synchronization source when the first synchronization information is different from the third synchronization information. In an embodiment, the processing unit 610 is further configured to determine an identifier of the second synchronization signal based on the second synchronization information received by the receiving unit 630.

Optionally, in another embodiment, the processing unit 610 determines that the first terminal device and the second terminal device have not implemented signal synchronization when at least one of the following conditions is not met:
an identifier of the first synchronization signal is the same as the identifier of the second synchronization signal or a parameter included in the first master information block is the same as a parameter included in the second master information block.

In an embodiment, the processing unit 610 is further configured to determine an identifier of the third synchronization signal based on the third synchronization information received by the receiving unit 630.

Optionally, in another embodiment, the processing unit 610 determines that the first terminal device and the second terminal device have not implemented signal synchronization when at least one of the following conditions is not met:
the identifier of the first synchronization signal is the same as the identifier of the third synchronization signal or the parameter included in the first master information block is the same as a parameter included in the third master information block.

Further, after the processing unit 610 enables the first terminal device to perform signal synchronization by using the second terminal device as a synchronization source, the sending unit 620 is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

In this embodiment, the first synchronization signal includes a first PSSS and a first SSSS, where the first PSSS and the first SSSS are used to determine the identifier of the first synchronization signal; the second synchronization signal includes a second PSSS and a second SSSS, where the second PSSS and the second SSSS are used to determine the identifier of the second synchronization signal; and the third synchronization signal includes a third PSSS and a third SSSS, where the third PSSS and the third SSSS are used to determine the identifier of the third synchronization signal.

In this embodiment, the first master information block includes at least one of the following parameters:
bandwidth information of the first terminal device, time division duplex TDD information of the first terminal device, reserved bit information of the first terminal device, or coverage area information of the first terminal device.

The second master information block includes at least one of the following parameters:
bandwidth information of the second terminal device, time division duplex TDD information of the second terminal device, reserved bit information of the second terminal device, or coverage area information of the second terminal device.

The third master information block includes at least one of the following parameters:

bandwidth information of the second terminal device, time division duplex TDD information of the second terminal device, reserved bit information of the second terminal device, or coverage area information of the second terminal device, where the parameter included in the third master information block is a parameter related to the second terminal device that is included in the third synchronization information received by the first terminal device after the first terminal device receives the second synchronization information and waits for the random duration.

The apparatus 600 corresponds to the first terminal device in the method embodiments. The apparatus 600 may be the first terminal device in the method embodiments, or a chip or a functional module in the first terminal device in the method embodiments. The corresponding units of the apparatus 600 are configured to perform corresponding steps performed by the first terminal device in the method embodiment shown in FIG. 3.

The processing unit 610 in the apparatus 600 is configured to perform a corresponding step related to processing by the first terminal device in the method embodiments, for example, step S330 in FIG. 3 of determining whether the first terminal device and the second terminal device have implemented signal synchronization.

The sending unit 620 in the apparatus 600 performs a step of sending by the first terminal device in the method embodiments, for example, step S310 in FIG. 3 of broadcasting the first synchronization information.

The receiving unit 630 in the apparatus 600 performs a step of receiving by the first terminal device in the method embodiments, for example, step S320 in FIG. 3 of receiving the second synchronization information from the second terminal device.

The receiving unit 630 and the sending unit 620 may form a transceiver unit that has both receiving and sending functions. The processing unit 610 may be at least one processor. The sending unit 620 may be a transmitter or an interface circuit, and the receiving unit 630 may be a receiver or an interface circuit. The receiver and the transmitter may be integrated to form a transceiver or an interface circuit. Optionally, the apparatus 600 may further include a storage unit, configured to store data and/or signaling. The processing unit 610, the sending unit 620, and the receiving unit 630 may interact with or be coupled to the storage unit. For example, the data and/or signaling in the storage unit are read or invoked, so that the method in the foregoing embodiment is performed.

The foregoing units may exist independently, or may be all or partially integrated.

In an implementation, the apparatus 600 may be the first terminal device in the method embodiments. The corresponding units included in the apparatus 600 are respectively configured to perform corresponding operations and/or processing performed by the first terminal device in the method embodiments.

For example, the sending unit 620 and the receiving unit 630 are transceivers, and the processing unit 610 may be a processor. The transceiver has a sending and/or receiving function, and the transceiver may also be replaced by a receiver and/or a transmitter.

In another implementation, the apparatus 600 may be a chip or an integrated circuit. In this case, the sending unit 620 and the receiving unit 630 may be communication interfaces, and the processing unit 610 may be a logic circuit.

Optionally, the communication interface may be an input/output interface or a transceiver circuit. The input/output interface may include an input interface and an output interface. The transceiver circuit may include an input interface circuit and an output interface circuit.

In an implementation, the processing unit 610 may be a processing apparatus, and a part of or all functions of the processing apparatus may be implemented by software.

Optionally, a part or all of the functions of the processing apparatus may be implemented by software. In this case, the processing apparatus may include a memory and a processor. The memory is configured to store a computer program, and the processor reads and executes the computer program stored in the memory, to perform corresponding processing and/or steps in any method embodiment.

Optionally, the processing apparatus may include only the processor. A memory configured to store a computer program is located outside the processing apparatus. The processor is connected to the memory through a circuit/an electric wire, to read and execute the computer program stored in the memory.

Optionally, a part or all of the functions of the processing apparatus may be implemented by hardware. In this case, the processing apparatus may include an input interface circuit, a logical circuit, and an output interface circuit. Details are shown in FIG. 7.

Figure 7:
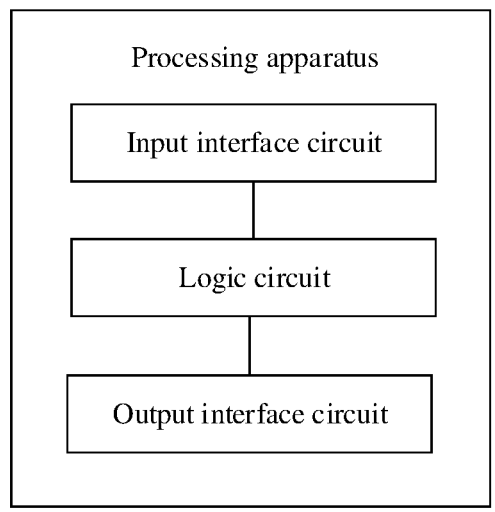
FIG. 7 is a schematic diagram of a structure of a processing apparatus according to an embodiment of this application.

FIG. 7 is a schematic diagram of a structure of a processing apparatus according to an embodiment of this application. An output interface circuit is configured to broadcast first synchronization information, where the first synchronization information includes a first synchronization signal and a first master information block. The processing apparatus includes a processing apparatus disposed in a first terminal device. In this embodiment, after performing processing (for example, signal amplification or frequency boosting) through the output interface circuit and a radio frequency circuit, the processing apparatus broadcasts the first synchronization information by using an antenna.

An input interface circuit is configured to receive second synchronization information from a second terminal device, where the second synchronization information includes a second synchronization signal and a second master information block. In this embodiment, the processing apparatus receives the second synchronization information by using the antenna, and basic processing (for example, noise filtering, signal amplification, and frequency reduction) is performed on the second synchronization information by using the radio frequency circuit and the interface circuit.

A logic circuit is configured to determine, based on the first synchronization information and the second synchronization information, whether the first terminal device and the second terminal device have implemented signal synchronization. It may be understood that the processing apparatus determines, by using the logic circuit, whether content included in the first synchronization information is completely the same as content included in the second synchronization information.

In this embodiment, the logic circuit is configured to enable the first terminal device to remain as a terminal device without selected synchronization reference when the first synchronization information is the same as the second synchronization information; and the logic circuit is configured to enable the first terminal device to perform signal synchronization by using the second terminal device as a synchronization source when the first synchronization information is different from the second synchronization information; or the logic circuit is configured to enable the input interface circuit to receive third synchronization information from the second terminal device after the input interface circuit receives the second synchronization information and waits for a random duration when the first synchronization information is different from the second synchronization information, where the third synchronization information includes a third synchronization signal and a third master information block.

The logic circuit is configured to enable the first terminal device to remain as the terminal device without selected synchronization reference when the first synchronization information is the same as the third synchronization information; and the logic circuit is configured to enable the first terminal device to perform signal synchronization by using the second terminal device as a synchronization source when the first synchronization information is different from the third synchronization information.

In an embodiment, the logic circuit is further configured to determine an identifier of the second synchronization signal based on second synchronization information received by the input interface circuit.

Optionally, in another embodiment, the logic circuit determines that the first terminal device and the second terminal device have not implemented signal synchronization when at least one of the following conditions is not met:

an identifier of the first synchronization signal is the same as the identifier of the second synchronization signal or a parameter included in the first master information block is the same as a parameter included in the second master information block.

In an embodiment, the logic circuit is further configured to determine an identifier of the third synchronization signal based on third synchronization information received by the input interface circuit.

Optionally, in another embodiment, the logic circuit determines that the first terminal device and the second terminal device have not implemented signal synchronization when at least one of the following conditions is not met:

the identifier of the first synchronization signal is the same as the identifier of the third synchronization signal or the parameter included in the first master information block is the same as a parameter included in the third master information block.

Further, after the logic circuit enables the first terminal device to perform signal synchronization by using the second terminal device as a synchronization source, the output interface circuit is further configured to broadcast fourth synchronization information when signal quality of the fourth synchronization information received by the first terminal device from the second terminal device is less than or equal to a preset threshold, where the fourth synchronization information includes the second synchronization information or the third synchronization information.

Optionally, the processing apparatus may be one or more chips, or one or more integrated circuits.

For example, the processing apparatus may be one or more field-programmable gate array (FPGA), application specific integrated circuit (ASIC), SoCs, central processing unit (CPU), network processor (NP), digital signal processor (DSP), micro controller unit (MCU), programmable logic device (PLD), another integrated chip, or any combination of the foregoing chips or processors.

In addition, this application further provides a first terminal device. The following provides descriptions with reference to FIG. 8.

Figure 8:
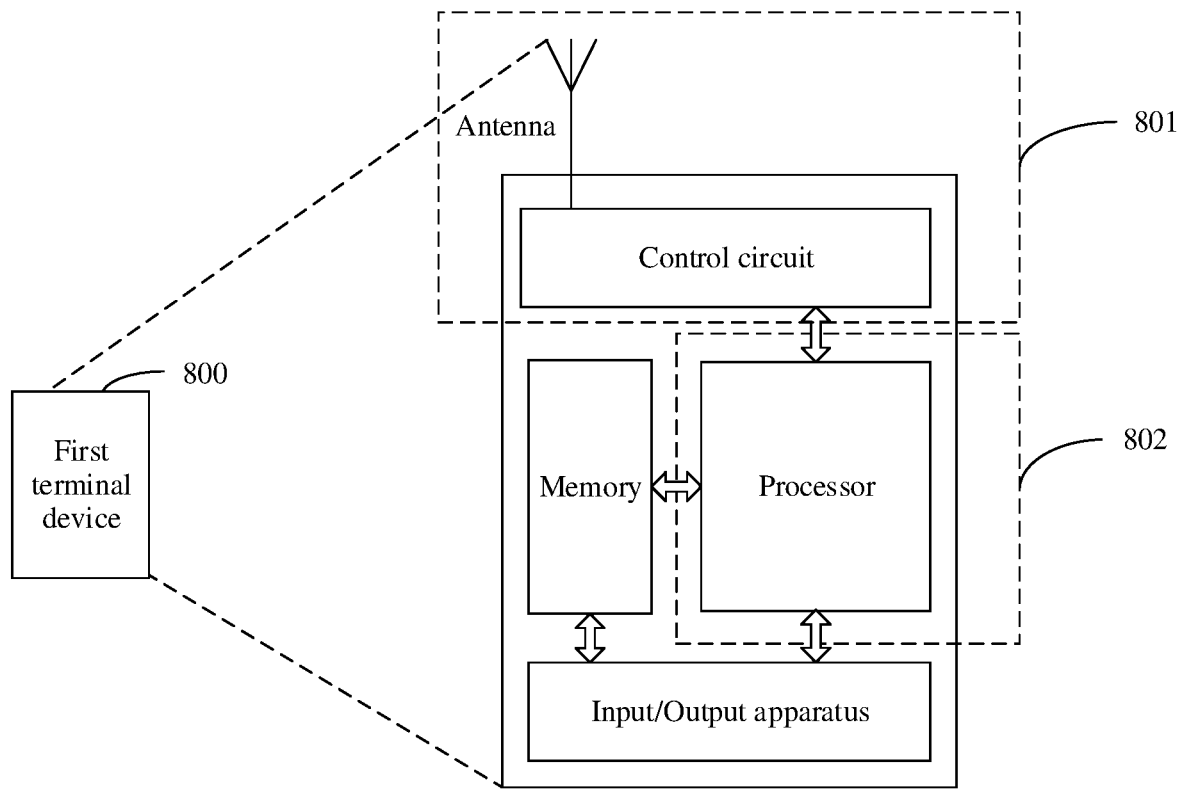
FIG. 8 is a schematic diagram of a structure of a first terminal device to which an embodiment of this application is applicable.

FIG. 8 is a schematic diagram of a structure of a first terminal device 800 to which an embodiment of this application is applicable. The first terminal device 800 may be used in the system shown in FIG. 2. For ease of description, FIG. 8 shows only main components of the first terminal device. As shown in FIG. 8, the first terminal device 800 includes a processor, a memory, a control circuit, an antenna, and an input/output apparatus. The processor is configured to control the antenna and the input/output apparatus to send or receive a signal. The memory is configured to store a computer program. The processor is configured to invoke the computer program from the memory and run the computer program, to perform a corresponding procedure and/or operation performed by the terminal device in the method for signal synchronization provided in this application.

A person skilled in the art may understand that, for ease of description, FIG. 8 shows only one memory and one processor. An actual terminal device may include a plurality of processors and memories. The memory may also be referred to as a storage medium, a storage device, or the like. This is not limited in embodiments of this application.

Figure 9:
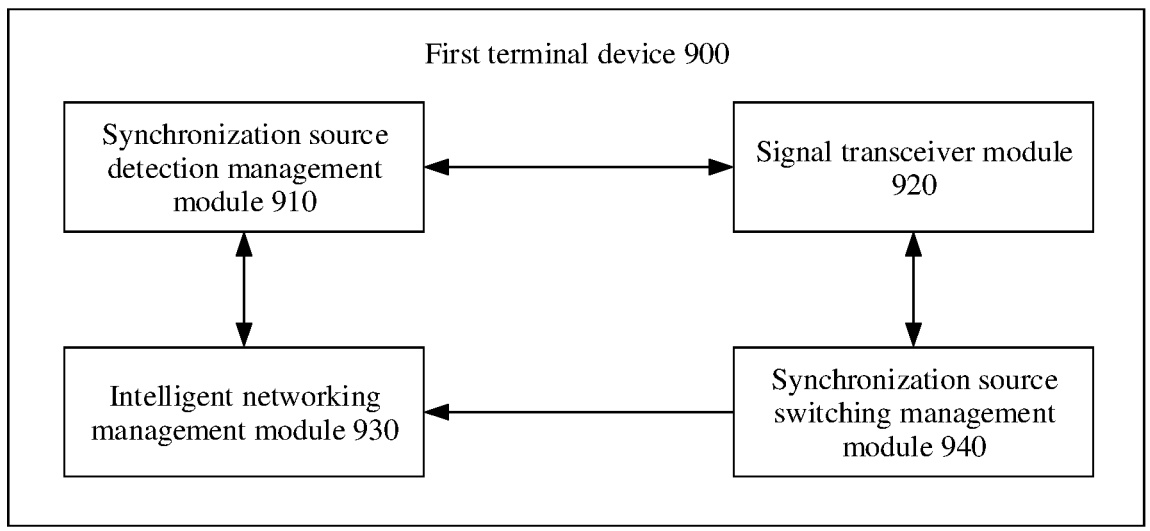
FIG. 9 is a schematic diagram of a structure of a first terminal device to which an embodiment of this application is applicable.

In this embodiment, the first terminal device may be further divided into a structure shown in FIG. 9, to implement the method for signal synchronization shown in FIG. 3. FIG. 9 is a schematic diagram of a structure of a first terminal device 900 to which an embodiment of this application is applicable.

An intelligent networking management module 930 is an overall control module, and controls a synchronization source detection management module 910 to send and receive synchronization information, cache information about another terminal device that is reported by the synchronization source detection management module 910, and control a synchronization source switching management module 940 to switch to a new synchronization source.

The synchronization source detection management module 910, as an implementation module for controlling synchronization source detection and management, mainly includes functions of starting a signal transceiver module 920 to send synchronization information, classifying and prioritizing synchronization information received by the signal transceiver module 920, and reporting the synchronization information to the master control intelligent networking management module 930.

The synchronization source switching management module 940 is configured to control the signal transceiver module 920 to synchronize with a new synchronization source.

The signal transceiver module 920 is configured to send synchronization information of the first terminal device, and detect and receive synchronization information of another terminal device.

It should be understood that the intelligent networking management module 930, the synchronization source detection management module 910, and the synchronization source switching management module 940 in FIG. 9 may be integrated into the processor shown in FIG. 8. The signal transceiver module 920 in FIG. 9 may be understood as the antenna shown in FIG. 8. The structure shown in FIG. 9 is merely an example, and constitutes no limitation on the protection scope of this application.

An embodiment of this application further provides a communication system, including the foregoing first terminal device, second terminal device, and access network device.

This application further provides a computer-readable storage medium. The computer-readable storage medium stores instructions. When the instructions are run on a computer, the computer is enabled to perform the steps performed by the first terminal device in the method shown in FIG. 3.

This application further provides a computer program product including instructions. When the computer program product runs on a computer, the computer is enabled to perform the steps performed by the first terminal device in the method shown in FIG. 3.

This application further provides a chip, including a processor. The processor is configured to read and run a computer program stored in a memory, to perform a corresponding operation and/or procedure performed by the first terminal device in the methods for signal synchronization according to this application. Optionally, the chip further includes a memory. The memory is connected to the processor through a circuit or a wire, and the processor is configured to read and execute a computer program in the memory. Further, optionally, the chip further includes a communication interface, and the processor is connected to the communication interface. The communication interface is configured to receive data and/or information to be processed, and the processor obtains the data and/or information from the communication interface, and processes the data and/or information. The communication interface may be an input/output interface, an interface circuit, an output circuit, an input circuit, a pin, a related circuit, or the like on the chip. The processor may alternatively be embodied as a processing circuit or a logic circuit.

The foregoing chip may be replaced with a chip system.

The processor mentioned in the foregoing embodiments may be an integrated circuit chip, and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA), another programmable logic device, a discrete gate, a transistor logic device, or a discrete hardware component. The general-purpose processor may be a microprocessor, or the processor may be any conventional processor or the like. The steps in the methods disclosed in embodiments of this application may be directly performed and completed by a hardware coding processor, or may be performed and completed by a combination of hardware in the coding processor and a software module. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

In addition, to facilitate understanding of embodiments of this application, the following several descriptions are provided.

First, in this application, "used to indicate" may include "used to directly indicate" and "used to indirectly indicate". When a piece of indication information is described as being used to indicate A, the indication information may directly indicate A or indirectly indicate A, but it does not necessarily indicate that the indication information includes A.

Second, "first", "second", and various numerical numbers (for example, "#1", and "#2") in this application are merely used to distinguish between objects for ease of description, but are not intended to limit the scope of embodiments of this application, for example, distinguish between different terminal devices.

Third, in this application, "preset" may include: being indicated by a network device by using signaling, or predefined, for example, defined in a protocol. "Pre-definition" may be implemented by prestoring corresponding code or a corresponding table in a device (for example, including a terminal device and a network device), or in another manner that may be used to indicate related information. A specific implementation is not limited in this application.

Fourth, "storage" in embodiments of this application may be storage in one or more memories. The one or more memories may be separately disposed, or may be integrated into an encoder, a translator, a processor, or a communication apparatus. Alternatively, a part of the one or more memories may be separately disposed, and a part of the one or more memories are integrated into the translator, the processor, or the communication apparatus. A type of the memory may be a storage medium in any form, and this is not limited in this application.

Fifth, the "protocol" in embodiments of this application may be a standard protocol in the communication field, for example, may include a 3GPP TS 36.331 V15.7.0 technical specification and a related protocol applied to a future communication system. This is not limited in this application.

In this application, the terms "include", "have" and any other variants mean to cover the non-exclusive inclusion, for example, a process, method, system, product, or device that includes a series of steps or units is not necessarily limited to those steps or units that are clearly listed, but may include other steps or units not expressly listed or inherent to such a process, method, product, or device.

A person of ordinary skill in the art may be aware that, in combination with units, algorithms and steps in the examples described in embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or other forms.

The units described as separate parts may or may not be physically separate, and parts displayed as units may or may not be physical units, to be specific, may be located in one position, or may be distributed on a plurality of network units. A part or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technologies, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, or C may indicate the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for signal synchronization, comprising:
   broadcasting, by a first terminal device, first synchronization information, wherein the first synchronization information includes a first synchronization signal and a first master information block, and the first terminal device is a terminal device without selected-synchronization-reference;
   receiving, by the first terminal device, second synchronization information from a second terminal device, wherein the second synchronization information includes a second synchronization signal and a second master information block;
   remaining, by the first terminal device, as the terminal device without selected-synchronization-reference when the first synchronization information is the same as the second synchronization information; and
   when the first synchronization information is different from the second synchronization information,
      receiving, by the first terminal device, third synchronization information from the second terminal device after receiving the second synchronization information and waiting for a random duration, wherein the third synchronization information includes a third synchronization signal and a third master information block, and
      performing, by the first terminal device, signal synchronization by using the second terminal device as a synchronization source when the first synchronization information is different from the third synchronization information or remaining, by the first terminal device, as the terminal device without selected-synchronization-reference when the first synchronization information is the same as the third synchronization information.

2. The method according to claim 1, wherein that the first synchronization information is different from the second synchronization information comprises at least one of:
   an identifier of the first synchronization signal is different from an identifier of the second synchronization signal, or a parameter comprised in the first master information block is different from a parameter comprised in the second master information block; and
   that the first synchronization information is different from the third synchronization information comprises at least one of:
   the identifier of the first synchronization signal is different from an identifier of the third synchronization signal, or the parameter comprised in the first master information block is different from a parameter comprised in the third master information block.

3. The method according to claim 1, wherein the first synchronization information is different from the second synchronization information, and after the performing, by the first terminal device, signal synchronization by using the second terminal device as a synchronization source, the method further comprises:
   broadcasting, by the first terminal device, fourth synchronization information when signal quality of the fourth synchronization information received by the first terminal device from the second terminal device is less than or equal to a preset threshold, wherein the fourth synchronization information comprises the second synchronization information or the third synchronization information.

4. The method according to claim 1, wherein the remaining, by the first terminal device, as the terminal device without selected-synchronization-reference when the first synchronization information is the same as the second synchronization information comprises:
   broadcasting, by the first terminal device, the first synchronization information when the first synchronization information is the same as the second synchronization information and signal quality of the second synchronization information received by the first terminal device is greater than a preset threshold; and
   the remaining, by the first terminal device, as the terminal device without selected-synchronization-reference when the first synchronization information is the same as the third synchronization information comprises:

broadcasting, by the first terminal device, the first synchronization information when the first synchronization information is the same as the third synchronization information and signal quality of the third synchronization information received by the first terminal device is greater than the preset threshold.

5. The method according to claim 1, wherein the first terminal device and the second terminal device are different vehicles.

6. An apparatus for signal synchronization, wherein the apparatus is used in a first terminal device, the first terminal device is a terminal device without selected-synchronization-reference, and the apparatus comprises:
a receiver, configured to broadcast first synchronization information, wherein the first synchronization information includes a first synchronization signal and a first master information block, and
receive second synchronization information from a second terminal device, wherein the second synchronization information includes a second synchronization signal and a second master information block;
a processor, configured to enable the first terminal device to remain as the terminal device without selected-synchronization-reference when the first synchronization information is the same as the second synchronization information; and
the processor is further configured to enable the receiver to receive third synchronization information from the second terminal device after receiving the second synchronization information and waiting for a random duration when the first synchronization information is different from the second synchronization information, wherein the third synchronization information comprises a third synchronization signal and a third master information block,
enable the first terminal device to remain as the terminal device without selected-synchronization-reference when the first synchronization information is the same as the third synchronization information, and
enable the first terminal device to perform signal synchronization by using the second terminal device as a synchronization source when the first synchronization information is different from the third synchronization information.

7. The apparatus according to claim 6, wherein that the first synchronization information is different from the second synchronization information comprises at least one of:
an identifier of the first synchronization signal is different from an identifier of the second synchronization signal, or a parameter comprised in the first master information block is different from a parameter comprised in the second master information block; and
that the first synchronization information is different from the third synchronization information comprises at least one of:
the identifier of the first synchronization signal is different from an identifier of the third synchronization signal, or the parameter comprised in the first master information block is different from a parameter comprised in the third master information block.

8. The apparatus according to claim 6, wherein after the first terminal device performs signal synchronization by using the second terminal device as the synchronization source, the receiver is further configured to broadcast fourth synchronization information when signal quality of the fourth synchronization information received by the first terminal device from the second terminal device is less than or equal to a preset threshold, wherein the fourth synchronization information comprises the second synchronization information or the third synchronization information.

9. The apparatus according to claim 6, wherein enabling the first terminal device to remain as the terminal device without selected-synchronization-reference when the first synchronization information is the same as the second synchronization information comprises:
enabling the receiver to broadcast the first synchronization information when the first synchronization information is the same as the second synchronization information and signal quality of the second synchronization information received by the first terminal device is greater than a preset threshold; and
enabling the first terminal device to remain as the terminal device without selected-synchronization-reference when the first synchronization information is the same as the third synchronization information comprises:
enabling the receiver to broadcast the first synchronization information when the first synchronization information is the same as the third synchronization information and signal quality of the third synchronization information received by the first terminal device is greater than the preset threshold.

10. The apparatus according to claim 6, wherein the first terminal device and the second terminal device are different vehicles.

11. A non-transitory computer readable medium storing program code that, when executed by a first terminal device or a processor in a first terminal device, enable the first terminal device to:
broadcast first synchronization information, wherein the first synchronization information includes a first synchronization signal and a first master information block, and the first terminal device is a terminal device without selected-synchronization-reference;
receive second synchronization information from a second terminal device, wherein the second synchronization information includes a second synchronization signal and a second master information block;
remain as the terminal device without selected-synchronization-reference when the first synchronization information is the same as the second synchronization information; and
when the first synchronization information is different from the second synchronization information,
receive third synchronization information from the second terminal device after receiving the second synchronization information and wait for a random duration, wherein the third synchronization information includes a third synchronization signal and a third master information block, and
perform signal synchronization by using the second terminal device as a synchronization source when the first synchronization information is different from the third synchronization information or remain as the terminal device without selected-synchronization-reference when the first synchronization information is the same as the third synchronization information.

12. The non-transitory computer readable medium according to claim 11, wherein that the first synchronization information is different from the second synchronization information comprises at least one of:
an identifier of the first synchronization signal is different from an identifier of the second synchronization signal, or a parameter comprised in the first master information block is different from a parameter comprised in the second master information block; and that the first synchronization information is different from the third synchronization information comprises at least one of:

the identifier of the first synchronization signal is different from an identifier of the third synchronization signal, or the parameter comprised in the first master information block is different from a parameter comprised in the third master information block.

13. The non-transitory computer readable medium according to claim 11, wherein after performing signal synchronization by using the second terminal device as a synchronization source, the first terminal device is further enabled to:

broadcast fourth synchronization information when signal quality of the fourth synchronization information received by the first terminal device from the second terminal device is less than or equal to a preset threshold, wherein the fourth synchronization information comprises the second synchronization information or the third synchronization information.

14. The non-transitory computer readable medium according to claim 11, wherein the remaining as the terminal device without selected-synchronization-reference when the first synchronization information is the same as the second synchronization information comprises:

broadcasting the first synchronization information when the first synchronization information is the same as the second synchronization information and signal quality of the second synchronization information received by the first terminal device is greater than a preset threshold; and the remaining as the terminal device without selected-synchronization-reference when the first synchronization information is the same as the third synchronization information comprises:

broadcasting the first synchronization information when the first synchronization information is the same as the third synchronization information and signal quality of the third synchronization information received by the first terminal device is greater than the preset threshold.

15. The non-transitory computer readable medium according to claim 11, wherein the first terminal device and the second terminal device are different vehicles.

* * * * *